United States Patent
Xu et al.

(10) Patent No.: US 10,362,562 B2
(45) Date of Patent: Jul. 23, 2019

(54) UPLINK SIGNAL CONTROL METHOD AND APPARATUS

(71) Applicant: Huawei Technologies Co., Ltd., Shenzhen (CN)

(72) Inventors: Xiaoying Xu, Shanghai (CN); Peng Zhang, Shanghai (CN); Xueli Ma, Shanghai (CN); Dong Chen, Shanghai (CN); Fangfu Guo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 148 days.

(21) Appl. No.: 15/235,475

(22) Filed: Aug. 12, 2016

(65) Prior Publication Data
US 2016/0353432 A1    Dec. 1, 2016

Related U.S. Application Data

(63) Continuation of application No. PCT/CN2014/072060, filed on Feb. 13, 2014.

(51) Int. Cl.
*H04W 72/04* (2009.01)
*H04W 52/14* (2009.01)
*H04W 84/04* (2009.01)

(52) U.S. Cl.
CPC ..... *H04W 72/0413* (2013.01); *H04W 52/146* (2013.01); *H04W 72/0406* (2013.01); *H04W 72/0426* (2013.01); *H04W 84/045* (2013.01)

(58) Field of Classification Search
CPC ..... H04L 47/10; H04L 43/50; H04L 12/2697; H04L 43/0852; H04L 43/00;
(Continued)

(56) References Cited

U.S. PATENT DOCUMENTS

2010/0303030 A1* 12/2010 Andersson ............ H04W 52/12
370/329
2011/0237288 A1    9/2011 Ratasuk et al.
(Continued)

FOREIGN PATENT DOCUMENTS

CA    2673078 A1    6/2008
CN    101800942 A    8/2010
(Continued)

*Primary Examiner* — Dady Chery

(57) ABSTRACT

An uplink signal control method and apparatus, which are used to resolve a problem that when a UE is not within primary carrier signal coverage of a micro cell, the micro cell cannot control uplink transmission of the UE on a primary carrier. The method includes: determining, by a first network device, uplink control configuration information for user equipment (UE), where the uplink control configuration information includes information about a control channel occupied by control information, which is transmitted by a second network device on a second carrier, for controlling an uplink transmission action of the UE on a first carrier; and notifying, by the first network device, the uplink control configuration information to the second network device, and sending the uplink control configuration information to the UE or instructing the second network device to send the uplink control configuration information to the UE.

21 Claims, 8 Drawing Sheets

(58) Field of Classification Search
CPC .......... H04L 2001/0097; H04L 5/0007; H04B 7/2606; H04B 7/155; H04W 88/04; H04W 16/26; H04W 28/04; H04W 72/04; H04W 72/042; H04W 88/08; H04W 72/0446
USPC ....... 370/252, 315, 329, 330, 336; 455/63.1, 455/69, 456.4, 522, 561
See application file for complete search history.

(56) References Cited

U.S. PATENT DOCUMENTS

| | | |
|---|---|---|
| 2012/0115535 A1 | 5/2012 | Jeong et al. |
| 2013/0033998 A1* | 2/2013 | Seo ................. H04W 24/00 370/252 |
| 2013/0142098 A1 | 6/2013 | Kwon et al. |
| 2013/0250881 A1 | 9/2013 | Liao et al. |
| 2013/0250882 A1 | 9/2013 | Dinan |
| 2013/0343311 A1 | 12/2013 | Tee et al. |
| 2017/0244534 A1 | 8/2017 | Heo et al. |

FOREIGN PATENT DOCUMENTS

| | | |
|---|---|---|
| CN | 102265677 A | 11/2011 |
| CN | 102469466 A | 5/2012 |
| JP | 2012169693 A | 9/2012 |
| KR | 20080056621 A | 6/2008 |
| KR | 20100083440 A | 7/2010 |
| KR | 20120015228 A | 2/2012 |

* cited by examiner

UPLINK SIGNAL CONTROL METHOD AND APPARATUS

CROSS-REFERENCE TO RELATED APPLICATIONS

This application is a continuation of International Application No. PCT/CN2014/072060, filed on Feb. 13, 2014, which is hereby incorporated by reference in its entirety.

TECHNICAL FIELD

The present invention relates to the field of communications technologies, and in particular, to an uplink signal control method and apparatus.

BACKGROUND

In a heterogeneous network of hybrid deployment of a macro cell and a micro cell, for example, in a scenario of dual frequency-dual cell (DF-DC), dual frequency-3 cell (DF-3C) or dual frequency-4 cell (DF-4C) deployment, transmit powers of the macro cell and the micro cell on a primary carrier are usually unequal, resulting in that an uplink balance and a downlink balance of user equipment (UE) cannot be aligned. Herein, the uplink balance is a location of the UE when signals of the UE that are received by the macro cell and the micro cell have same signal strength, and the downlink balance is a location of the UE when signals of the macro cell and the micro cell that are received by the UE have same signal strength.

As shown in FIG. 1, in the foregoing scenario of hybrid deployment of a macro cell and a micro cell, for a primary carrier F1, a transmit power of the macro cell is 43 db, and a transmit power of the micro cell is 30 db. In the foregoing, what is below MF1 represents coverage of the macro cell on the carrier F1, what is below PF1 represents coverage of the micro cell on a carrier F2. An intersection point of MF1 and PF1 is a downlink balance of the UE on the carrier F1. For the secondary carrier F2, transmit powers of the macro cell and the micro cell are both 30 db. In the foregoing, what is below MF2 represents coverage of the macro cell on the carrier F2, what is below PF2 represents coverage of the micro cell on the carrier F2. An intersection point of MF2 and PF2 is a downlink balance of the UE on the carrier F2. Because on F2, the transmit powers of the macro cell and the micro cell are equal, the downlink balance and an uplink balance of the UE on the carrier F2 may be considered to be at a same location.

In the foregoing scenario of deployment, for the primary carrier F1, when the UE moves from the uplink balance to the micro cell, a downlink of the micro cell does not meet a 1A event triggering condition, the micro cell cannot be added to an active set of the UE, and an uplink transmit power of the UE cannot be controlled. Even if a cell individual offset (CIO) is extended to enable the UE to add the micro cell to the active set, the UE still cannot receive a power control command of the micro cell. Therefore, the micro cell is subject to strong uplink interference from the UE, and an uplink capacity of the micro cell is reduced. In addition, after uplink decoupling is performed, an uplink serving cell and a downlink serving cell of the UE are different cells. For example, downlink transmission takes place at the macro cell, and uplink reception takes place at the micro cell. In this case, the UE cannot receive data of a control channel such as an E-HICH of the micro cell. For example, after sending uplink data to the micro cell, the UE cannot receive feedback information returned by the micro cell. In this way, the UE may continuously perform data retransmission, and as a result, a service of the UE cannot work normally.

In conclusion, when UE is not within primary carrier signal coverage of a micro cell, the micro cell cannot control an uplink transmission action of the UE on a primary carrier.

SUMMARY

Embodiments of the present invention provide an uplink signal control method and apparatus, which are used to resolve a problem that when UE is not within primary carrier signal coverage of a micro cell, the micro cell cannot control an uplink transmission action of the UE on a primary carrier.

According to a first aspect, an uplink signal control apparatus is provided, including:

a determining module, configured to determine uplink control configuration information for user equipment (UE), and transmit the determined uplink control configuration information to a sending module, where the uplink control configuration information includes information about a control channel occupied by control information, which is transmitted by a second network device on a second carrier, for controlling an uplink transmission action of the UE on a first carrier; and the sending module, configured to notify, to the second network device, the uplink control configuration information determined by the determining module, and send the uplink control configuration information to the UE or instruct the second network device to send the uplink control configuration information to the UE.

With reference to the first aspect, in a first possible implementation manner, the first carrier is a primary carrier, and the second carrier is a secondary carrier.

With reference to the first aspect or the first possible implementation manner of the first aspect, in a second possible implementation manner, the uplink signal control apparatus is a radio network controller (RNC), and the second network device is a base station.

With reference to the first aspect or the first or second possible implementation manner of the first aspect, in a third possible implementation manner, the control information includes power control information for controlling an uplink transmit power of the UE, and the control channel includes a first control channel used to send the power control information; and/or, the control information includes feedback information for uplink data that is sent by the UE to the second network device on the first carrier, and the control channel includes a second control channel used to send the feedback information.

With reference to the third possible implementation manner of the first aspect, in a fourth possible implementation manner, the first control channel includes at least one of an enhanced dedicated channel (E-DCH)-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

With reference to the first aspect or any possible implementation manner of the first to fourth possible implementation manners of the first aspect, in a fifth possible implementation manner, the apparatus further includes: a receiving module, configured to: before the determining module determines the uplink control configuration information, receive supported capability information reported by the UE, and transmit the received supported capability information to the determining module; and the determining module is further configured to: before determining the uplink control configuration information, determine, according to the supported capability information, that the UE supports reception of the control information on the second carrier.

With reference to the first aspect or any possible implementation manner of the first to fifth possible implementation manners of the first aspect, in a sixth possible implementation manner, the determining module is specifically configured to: when one or more of the following conditions are met, determine the uplink control configuration information:

a signal measurement result of the UE meets an event of a signal measurement report of a primary carrier or a secondary carrier;

the UE enters a region between an uplink balance of the first carrier and a downlink balance of the first carrier;

an uplink serving cell and a downlink serving cell of the UE are different cells, and the second network device provides a service to the uplink serving cell;

a value of uplink interference from the UE to the second network device exceeds a set interference threshold value;

a load of the second carrier exceeds a specified load threshold value; or a current primary carrier cannot be switched from the first carrier to the second carrier.

According to a second aspect, an uplink signal control apparatus is provided, including:

a receiving module, configured to receive uplink control configuration information sent by a first network device, and transmit the received uplink control configuration information to a sending module, where the uplink control configuration information includes information about a control channel occupied by control information, which is transmitted by the sending module on a second carrier, for controlling an uplink transmission action of user equipment (UE) on a first carrier; and the sending module, configured to send the control information to the UE on the second carrier according to the uplink control configuration information received by the receiving module.

With reference to the second aspect, in a first possible implementation manner, the sending module is further configured to: before the control information is sent to the UE, send the uplink control configuration information to the UE.

With reference to the second aspect or the first possible implementation manner of the second aspect, in a second possible implementation manner, the first carrier is a primary carrier, and the second carrier is a secondary carrier.

With reference to the second aspect or the first or second possible implementation manner of the second aspect, in a third possible implementation manner, the first network device is a radio network controller (RNC), and the uplink signal control apparatus is a base station.

With reference to the second aspect or any possible implementation manner of the first to third possible implementation manners of the second aspect, in a fourth possible implementation manner, the control information includes power control information for controlling an uplink transmit power of the UE, and the control channel includes a first control channel used to send the power control information; and/or, the control information includes feedback information for uplink data that is sent by the UE to the uplink signal control apparatus on the first carrier, and the control channel includes a second control channel used to send the feedback information.

With reference to the fourth possible implementation manner of the second aspect, in a fifth possible implementation manner, the first control channel includes at least one of an enhanced dedicated channel-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

With reference to the second aspect or any possible implementation manner of the first to fifth possible implementation manners of the second aspect, in a sixth possible implementation manner, the sending module is further configured to: after the receiving module receives the uplink control configuration information, before the control information is sent to the UE, and after the control information needs to be sent to the UE, send reception indication information to the UE, where the reception indication information is used to instruct the UE to receive the control information on the second carrier.

With reference to the second aspect or any possible implementation manner of the first to sixth possible implementation manners of the second aspect, in a seventh possible implementation manner, the sending module is specifically configured to: when one or more of the following conditions are met, send the control information to the UE on the second carrier:

a signal measurement result of the UE meets an event of a signal measurement report of a primary carrier or a secondary carrier;

the UE enters a region between an uplink balance of the first carrier and a downlink balance of the first carrier;

an uplink serving cell and a downlink serving cell of the UE are different cells, and the uplink signal control apparatus provides a service to the uplink serving cell;

a value of uplink interference to the uplink signal control apparatus from the UE exceeds a set interference threshold value;

a load of the second carrier exceeds a specified load threshold value; or a current primary carrier cannot be switched from the first carrier to the second carrier.

According to a third aspect, user equipment (UE) is provided, including:

a first receiving module, configured to receive uplink control configuration information determined and sent by a first network device or receive uplink control configuration information sent by a second network device, and transmit the received uplink control configuration information to a second receiving module, where the uplink control configuration information includes information about a control channel occupied by control information, which is transmitted by the second network device on a second carrier, for controlling an uplink transmission action of the UE on a first carrier;

the second receiving module, configured to receive, on a second carrier according to the uplink control configuration information received by the first receiving module, the control information sent by the second network device, and transmit the received control information to a control module; and the control module, configured to control the uplink transmission action of the UE on the first carrier according to the control information received by the second receiving module.

With reference to the third aspect, in a first possible implementation manner, the first carrier is a primary carrier, and the second carrier is a secondary carrier.

With reference to the third aspect or the first possible implementation manner of the third aspect, in a second possible implementation manner, the first network device is a radio network controller (RNC), and the second network device is a base station.

With reference to the third aspect or the first or second possible implementation manner of the third aspect, in a third possible implementation manner, the control information includes power control information for controlling an uplink transmit power of the UE, and the control channel includes a first control channel used to send the power control information; and/or, the control information includes feedback information for uplink data that is sent by the UE to the second network device on the first carrier, and the control channel includes a second control channel used to send the feedback information.

With reference to the third possible implementation manner of the third aspect, in a fourth possible implementation manner, the first control channel includes at least one of an enhanced dedicated channel-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

With reference to the third or fourth possible implementation manner of the third aspect, in a fifth possible implementation manner, if the control information includes the power control information, the control module is specifically configured to adjust the uplink transmit power of the UE according to the power control information; and if the control information includes the feedback information, the control module is specifically configured to determine, according to feedback information sent by the second network device, whether the second network device correctly receives the uplink data sent by the UE.

With reference to the third or fourth possible implementation manner of the third aspect, in a sixth possible implementation manner, the second receiving module is further configured to receive, on the first carrier, control information sent by a third network device managed by the first network device, and transmit, to the control module, the control information sent by the third network device; and the control module is specifically configured to control the uplink transmission action of the UE on the first carrier according to the control information sent by the second network device and the control information sent by the third network device.

With reference to the sixth possible implementation manner of the third aspect, in a seventh possible implementation manner, if the control information includes the power control information, the control module is specifically configured to: when either power control information of the power control information sent by the second network device and the power control information sent by the third network device instructs the UE to reduce the uplink transmit power, reduce the uplink transmit power of the UE; and if the control information includes the feedback information, the control module is specifically configured to: when either feedback information of feedback information sent by the second network device and feedback information sent by the third network device includes acknowledgment ACK information, determine that the uplink data of the UE is sent successfully.

With reference to the third aspect or any possible implementation manner of the first to seventh possible implementation manners of the third aspect, in an eighth possible implementation manner, the apparatus further includes:

a sending module, configured to: before the first receiving module receives the uplink control configuration information, report supported capability information of the UE, to notify the first network device that the UE supports reception of the control information on the second carrier.

With reference to the third aspect or any possible implementation manner of the first to eighth possible implementation manners of the third aspect, in a ninth possible implementation manner, the second receiving module is further configured to: before the control information is received on the second carrier, receive reception indication information sent by the second network device, where the reception indication information is used to instruct the UE to receive the control information on the second carrier.

According to a fourth aspect, an uplink signal control apparatus is provided, including:

a processor, configured to determine uplink control configuration information for user equipment (UE), and transmit the determined uplink control configuration information to a transmitter, where the uplink control configuration information includes information about a control channel occupied by control information, which is transmitted by a second network device on a second carrier, for controlling an uplink transmission action of the UE on a first carrier; and the transmitter, configured to notify, to the second network device, the uplink control configuration information determined by the processor, and send the uplink control configuration information to the UE or instruct the second network device to send the uplink control configuration information to the UE.

With reference to the fourth aspect, in a first possible implementation manner, the first carrier is a primary carrier, and the second carrier is a secondary carrier.

With reference to the fourth aspect or the first possible implementation manner of the fourth aspect, in a second possible implementation manner, the uplink signal control apparatus is a radio network controller (RNC), and the second network device is a base station.

With reference to the fourth aspect or the first or second possible implementation manner of the fourth aspect, in a third possible implementation manner, the control information includes power control information for controlling an uplink transmit power of the UE, and the control channel includes a first control channel used to send the power control information; and/or, the control information includes feedback information for uplink data that is sent by the UE to the second network device on the first carrier, and the control channel includes a second control channel used to send the feedback information.

With reference to the third possible implementation manner of the fourth aspect, in a fourth possible implementation manner, the first control channel includes at least one of an enhanced dedicated channel-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

With reference to the fourth aspect or any possible implementation manner of the first to fourth possible implementation manners of the fourth aspect, in a fifth possible implementation manner, the uplink signal control apparatus further includes: a receiver, configured to: before the processor determines the uplink control configuration information, receive supported capability information reported by the UE, and transmit the received supported capability information to the processor; and the processor is further configured to: before the uplink control configuration information is determined, determine, according to the supported capability information, that the UE supports reception of the control information on the second carrier.

With reference to the fourth aspect or any possible implementation manner of the first to fifth possible implementation manners of the fourth aspect, in a sixth possible implementation manner, the processor is specifically configured to: when one or more of the following conditions are met, determine the uplink control configuration information:

a signal measurement result of the UE meets an event of a signal measurement report of a primary carrier or a secondary carrier;

the UE enters a region between an uplink balance of the first carrier and a downlink balance of the first carrier;

an uplink serving cell and a downlink serving cell of the UE are different cells, and the second network device provides a service to the uplink serving cell;

a value of uplink interference from the UE to the second network device exceeds a set interference threshold value;

a load of the second carrier exceeds a specified load threshold value; or a current primary carrier cannot be switched from the first carrier to the second carrier.

According to a fifth aspect, an uplink signal control apparatus is provided, including:

a receiver, configured to receive uplink control configuration information sent by a first network device, and transmit the received uplink control configuration information to a transmitter, where the uplink control configuration information includes information about a control channel occupied by control information, which is transmitted by the transmitter on a second carrier, for controlling an uplink transmission action of user equipment (UE) on a first carrier; and the transmitter, configured to send the control information to the UE on the second carrier according to the uplink control configuration information received by the receiver.

With reference to the fifth aspect, in a first possible implementation manner, the transmitter is further configured to: before the control information is sent to the UE, send the uplink control configuration information to the UE.

With reference to the fifth aspect or the first possible implementation manner of the fifth aspect, in a second possible implementation manner, the first carrier is a primary carrier, and the second carrier is a secondary carrier.

With reference to the fifth aspect or the first or second possible implementation manner of the fifth aspect, in a third possible implementation manner, the first network device is a radio network controller (RNC), and the uplink signal control apparatus is a base station.

With reference to the fifth aspect or any possible implementation manner of the first to third possible implementation manners of the fifth aspect, in a fourth possible implementation manner, the control information includes power control information for controlling an uplink transmit power of the UE, and the control channel includes a first control channel used to send the power control information; and/or, the control information includes feedback information for uplink data that is sent by the UE to the uplink signal control apparatus on the first carrier, and the control channel includes a second control channel used to send the feedback information.

With reference to the fourth possible implementation manner of the fifth aspect, in a fifth possible implementation manner, the first control channel includes at least one of an enhanced dedicated channel-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

With reference to the fifth aspect or any possible implementation manner of the first to fifth possible implementation manners of the fifth aspect, in a sixth possible implementation manner, the transmitter is further configured to: after the receiver receives the uplink control configuration information, before the control information is sent to the UE, and after the control information needs to be sent to the UE, send reception indication information to the UE, where the reception indication information is used to instruct the UE to receive the control information on the second carrier.

With reference to the fifth aspect or any possible implementation manner of the first to sixth possible implementation manners of the fifth aspect, in a seventh possible implementation manner, the transmitter is specifically configured to: when one or more of the following conditions are met, send the control information to the UE on the second carrier:

a signal measurement result of the UE meets an event of a signal measurement report of a primary carrier or a secondary carrier;

the UE enters a region between an uplink balance of the first carrier and a downlink balance of the first carrier;

an uplink serving cell and a downlink serving cell of the UE are different cells, and the uplink signal control apparatus provides a service to the uplink serving cell;

a value of uplink interference to the uplink signal control apparatus from the UE exceeds a set interference threshold value;

a load of the second carrier exceeds a specified load threshold value; or a current primary carrier cannot be switched from the first carrier to the second carrier.

According to a sixth aspect, user equipment (UE) is provided, including:

a receiver, configured to receive uplink control configuration information determined and sent by a first network device or receive uplink control configuration information sent by a second network device, receive, on a second carrier according to the received uplink control configuration information, control information sent by the second network device, and transmit the received control information to a processor, where the uplink control configuration information includes information about a control channel occupied by the control information, which is transmitted by the second network device on the second carrier, for controlling an uplink transmission action of the UE on a first carrier; and the processor, configured to control the uplink transmission action of the UE on the first carrier according to the control information received by the receiver.

With reference to the sixth aspect, in a first possible implementation manner, the first carrier is a primary carrier, and the second carrier is a secondary carrier.

With reference to the sixth aspect or the first possible implementation manner of the sixth aspect, in a second possible implementation manner, the first network device is a radio network controller (RNC), and the second network device is a base station.

With reference to the sixth aspect or the first or second possible implementation manner of the sixth aspect, in a third possible implementation manner, the control information includes power control information for controlling an uplink transmit power of the UE, and the control channel includes a first control channel used to send the power control information; and/or, the control information includes feedback information for uplink data that is sent by the UE to the second network device on the first carrier, and the control channel includes a second control channel used to send the feedback information.

With reference to the third possible implementation manner of the sixth aspect, in a fourth possible implementation manner, the first control channel includes at least one of an enhanced dedicated channel-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

With reference to the third or fourth possible implementation manner of the sixth aspect, in a fifth possible implementation manner, if the control information includes the power control information, the processor is specifically configured to adjust the uplink transmit power of the UE according to the power control information; and if the control information includes the feedback information, the processor is specifically configured to determine, according to feedback information sent by the second network device, whether the second network device correctly receives the uplink data sent by the UE.

With reference to the third or fourth possible implementation manner of the sixth aspect, in a sixth possible implementation manner, the receiver is further configured to receive, on the first carrier, control information sent by a third network device managed by the first network device, and transmit, to the processor, the control information sent by the third network device; and the processor is specifically configured to control the uplink transmission action of the UE on the first carrier according to the control information sent by the second network device and the control information sent by the third network device.

With reference to the sixth possible implementation manner of the sixth aspect, in a seventh possible implementation manner, if the control information includes the power control information, the processor is specifically configured to: when either power control information of the power control information sent by the second network device and the power control information sent by the third network device instructs the UE to reduce the uplink transmit power, reduce the uplink transmit power of the UE; and if the control information includes the feedback information, the processor is specifically configured to: when either feedback information of feedback information sent by the second network device and feedback information sent by the third network device includes acknowledgment ACK information, determine that the uplink data of the UE is sent successfully.

With reference to the sixth aspect or any possible implementation manner of the first to seventh possible implementation manners of the sixth aspect, in an eighth possible implementation manner, the UE further includes:

a transmitter, configured to: before the receiver receives the uplink control configuration information, report supported capability information of the UE, to notify the first network device that the UE supports reception of the control information on the second carrier.

With reference to the sixth aspect or any possible implementation manner of the first to eighth possible implementation manners of the sixth aspect, in a ninth possible implementation manner, the receiver is further configured to: before the control information is received on the second carrier, receive reception indication information sent by the second network device, where the reception indication information is used to instruct the UE to receive the control information on the second carrier.

According to a seventh aspect, an uplink signal control method is provided, where the method includes:

determining, by a first network device, uplink control configuration information for user equipment (UE), where the uplink control configuration information includes information about a control channel occupied by control information, which is transmitted by a second network device on a second carrier, for controlling an uplink transmission action of the UE on a first carrier; and notifying, by the first network device, the uplink control configuration information to the second network device, and sending the uplink control configuration information to the UE or instructing the second network device to send the uplink control configuration information to the UE.

With reference to the seventh aspect, in a first possible implementation manner, the first carrier is a primary carrier, and the second carrier is a secondary carrier.

With reference to the seventh aspect or the first possible implementation manner of the seventh aspect, in a second possible implementation manner, the first network device is a radio network controller (RNC), and the second network device is a base station.

With reference to the seventh aspect or the first or second possible implementation manner of the seventh aspect, in a third possible implementation manner, the control information includes power control information for controlling an uplink transmit power of the UE, and the control channel includes a first control channel used to send the power control information; and/or, the control information includes feedback information for uplink data that is sent by the UE to the second network device on the first carrier, and the control channel includes a second control channel used to send the feedback information.

With reference to the third possible implementation manner of the seventh aspect, in a fourth possible implementation manner, the first control channel includes at least one of an enhanced dedicated channel-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

With reference to the seventh aspect or any possible implementation manner of the first to fourth possible implementation manners of the seventh aspect, in a fifth possible implementation manner, before the determining, by a first network device, uplink control configuration information, the method further includes:

receiving, by the first network device, supported capability information reported by the UE, and determining, according to the supported capability information, that the UE supports reception of the control information on the second carrier.

With reference to the seventh aspect or any possible implementation manner of the first to fifth possible implementation manners of the seventh aspect, in a sixth possible implementation manner, the determining, by a first network device, uplink control configuration information includes:

when one or more of the following conditions are met, determining, by the first network device, the uplink control configuration information:

a signal measurement result of the UE meets an event of a signal measurement report of a primary carrier or a secondary carrier;

the UE enters a region between an uplink balance of the first carrier and a downlink balance of the first carrier;

an uplink serving cell and a downlink serving cell of the UE are different cells, and the second network device provides a service to the uplink serving cell;

a value of uplink interference from the UE to the second network device exceeds a set interference threshold value;

a load of the second carrier exceeds a specified load threshold value; or a current primary carrier cannot be switched from the first carrier to the second carrier.

According to an eighth aspect, an uplink signal control method is provided, where the method includes:

receiving, by a second network device, uplink control configuration information sent by a first network device, where the uplink control configuration information includes information about a control channel occupied by control information, which is transmitted by the second network device on a second carrier, for controlling an uplink transmission action of user equipment (UE) on a first carrier; and sending, by the second network device, the control information to the UE on the second carrier according to the uplink control configuration information.

With reference to the eighth aspect, in a first possible implementation manner, before the sending, by the second network device, the control information to the UE, the method further includes:

sending, by the second network device, the uplink control configuration information to the UE.

With reference to the eighth aspect or the first possible implementation manner of the eighth aspect, in a second possible implementation manner, the first carrier is a primary carrier, and the second carrier is a secondary carrier.

With reference to the eighth aspect or the first or second possible implementation manner of the eighth aspect, in a third possible implementation manner, the first network device is a radio network controller (RNC), and the second network device is a base station.

With reference to the eighth aspect or any possible implementation manner of the first to third possible implementation manners of the eighth aspect, in a fourth possible implementation manner, the control information includes power control information for controlling an uplink transmit power of the UE, and the control channel includes a first control channel used to send the power control information; and/or, the control information includes feedback information for uplink data that is sent by the UE to the second network device on the first carrier, and the control channel includes a second control channel used to send the feedback information.

With reference to the fourth possible implementation manner of the eighth aspect, in a fifth possible implementation manner, the first control channel includes at least one of an enhanced dedicated channel-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

With reference to the eighth aspect or any possible implementation manner of the first to fifth possible implementation manners of the eighth aspect, in a sixth possible implementation manner, after the receiving, by a second network device, uplink control configuration information, and before the sending the control information to the UE, the method further includes:

after the control information needs to be sent to the UE, sending, by the second network device, reception indication information to the UE, where the reception indication information is used to instruct the UE to receive the control information on the second carrier.

With reference to the eighth aspect or any possible implementation manner of the first to sixth possible implementation manners of the eighth aspect, in a seventh possible implementation manner, the sending, by the second network device, the control information to the UE on the second carrier includes:

when one or more of the following conditions are met, sending, by the second network device, the control information to the UE on the second carrier:

a signal measurement result of the UE meets an event of a signal measurement report of a primary carrier or a secondary carrier;

the UE enters a region between an uplink balance of the first carrier and a downlink balance of the first carrier;

an uplink serving cell and a downlink serving cell of the UE are different cells, and the second network device provides a service to the uplink serving cell;

a value of uplink interference from the UE to the second network device exceeds a set interference threshold value;

a load of the second carrier exceeds a specified load threshold value; or a current primary carrier cannot be switched from the first carrier to the second carrier.

According to a ninth aspect, an uplink signal control method is provided, where the method includes:

receiving, by user equipment (UE), uplink control configuration information determined and sent by a first network device or receiving uplink control configuration information sent by a second network device, where the uplink control configuration information includes information about a control channel occupied by control information, which is transmitted by the second network device on a second carrier, for controlling an uplink transmission action of the UE on a first carrier; and receiving, by the UE on the second carrier according to the uplink control configuration information, the control information sent by the second network device, and controlling the uplink transmission action of the UE on the first carrier according to the control information sent by the second network device.

With reference to the ninth aspect, in a first possible implementation manner, the first carrier is a primary carrier, and the second carrier is a secondary carrier.

With reference to the ninth aspect or the first possible implementation manner of the ninth aspect, in a second possible implementation manner, the first network device is a radio network controller (RNC), and the second network device is a base station.

With reference to the ninth aspect or the first or second possible implementation manner of the ninth aspect, in a third possible implementation manner, the control information includes power control information for controlling an uplink transmit power of the UE, and the control channel includes a first control channel used to send the power control information; and/or, the control information includes feedback information for uplink data that is sent by the UE to the second network device on the first carrier, and the control channel includes a second control channel used to send the feedback information.

With reference to the third possible implementation manner of the ninth aspect, in a fourth possible implementation manner, the first control channel includes at least one of an enhanced dedicated channel-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

With reference to the third or fourth possible implementation manner of the ninth aspect, in a fifth possible implementation manner, if the control information includes the power control information, the controlling, by the UE, the uplink transmission action of the UE on the first carrier according to the control information sent by the second network device includes: adjusting, by the UE, the uplink transmit power of the UE according to the power control information; and if the control information includes the feedback information, the controlling, by the UE, the uplink transmission action of the UE on the first carrier according to the control information sent by the second network device includes: determining, by the UE according to feedback information sent by the second network device, whether the second network device correctly receives the uplink data sent by the UE.

With reference to the third or fourth possible implementation manner of the ninth aspect, in a sixth possible implementation manner, the controlling, by the UE, the uplink transmission action of the UE on the first carrier according to the control information sent by the second network device includes:

controlling, by the UE, the uplink transmission action of the UE on the first carrier according to the control information sent by the second network device and control information that is sent by a third network device managed by the first network device and that is received on the first carrier.

With reference to the sixth possible implementation manner of the ninth aspect, in a seventh possible implementation manner, if the control information includes the power control information, the controlling, by the UE, the uplink transmission action of the UE on the first carrier includes: when either power control information of the power control information sent by the second network device and the power control information sent by the third network device instructs the UE to reduce the uplink transmit power, reducing, by the UE, the uplink transmit power of the UE; and if the control information includes the feedback information, the controlling, by the UE, the uplink transmission action of the UE on the first carrier includes: when either feedback information of feedback information sent by the second network device and feedback information sent by the third network device includes acknowledgment ACK information, determining, by the UE, that the uplink data of the UE is sent successfully.

With reference to the ninth aspect or any possible implementation manner of the first to seventh possible implementation manners of the ninth aspect, in an eighth possible implementation manner, before the receiving, by UE, uplink control configuration information, the method further includes:

reporting, by the UE, supported capability information of the UE, to notify the first network device that the UE supports reception of the control information on the second carrier.

With reference to the ninth aspect or any possible implementation manner of the first to eighth possible implementation manners of the ninth aspect, in a ninth possible implementation manner, before the receiving, by the UE on the second carrier according to the uplink control configuration information, the control information, the method further includes:

receiving, by the UE, reception indication information sent by the second network device, where the reception indication information is used to instruct the UE to receive the control information on the second carrier.

By means of the foregoing method or apparatus provided in any aspect of the first aspect to the ninth aspect, when a second network device cannot control, on a first carrier, an uplink transmission action of UE on the first carrier, the second network device may control, on a second carrier, the uplink transmission action of the UE on the first carrier. Therefore, when UE is not within primary carrier signal coverage of a micro cell, the micro cell still can control an uplink transmission action of the UE on a primary carrier by using another carrier.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

This specification describes various aspects with reference to user equipment and/or a base station.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a mobile terminal, a remote station, an access point, a remote terminal, an access terminal, a user terminal, a user agent, a user device, or user equipment.

The base station in the embodiments of the present invention may be an evolved NodeB (eNodeB) in a Long Term Evolution (LTE) system, and the like.

In addition, the term "and/or" in this specification describes only an association relationship for describing associated objects and represents that three relationships may exist. For example, A and/or B may represent the following three cases: Only A exists, both A and B exist, and only B exists.

The following further describes the embodiments of the present invention in detail with reference to this specification.

Figure 1:
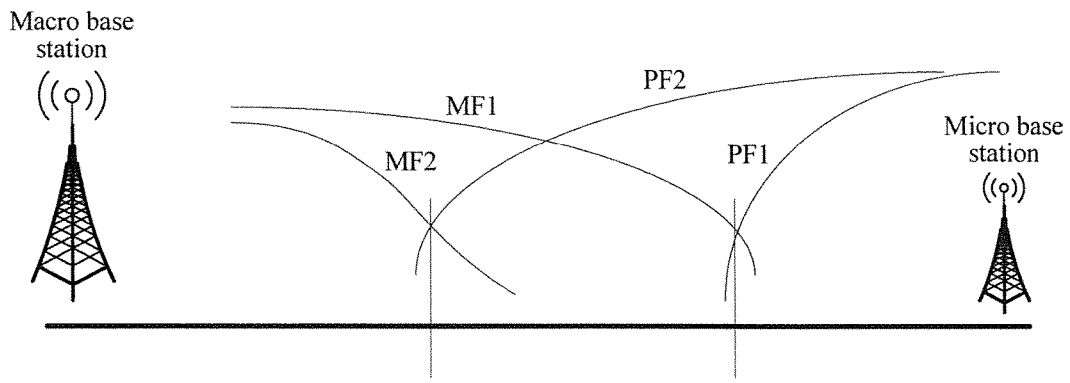
FIG. 1 is a schematic diagram of hybrid deployment of a macro cell and a micro cell.
Figure 2:
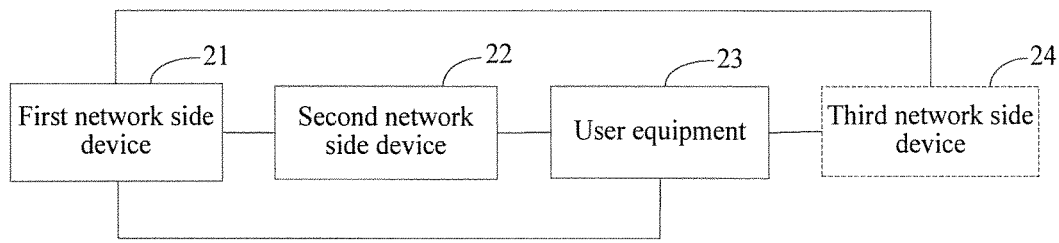
FIG. 2 is a schematic structural diagram of an uplink signal control system according to an embodiment of the present invention.

FIG. 2 is a schematic structural diagram of an uplink signal control system according to an embodiment of the present invention. The system includes:

a first network device 21, configured to determine uplink control configuration information for user equipment 23, and notify the uplink control configuration information to a second network device 22, and send the uplink control configuration information to the user equipment 23 or instruct the second network device 22 to send the uplink control configuration information to the user equipment 23, where the uplink control configuration information includes information about a control channel occupied by control information, which is transmitted by the second network device 22 on a second carrier, for controlling an uplink transmission action of the user equipment 23 on a first carrier;

a second network device 22, configured to receive the uplink control configuration information sent by the first network device 21, and send the control information to the user equipment 23 on the second carrier according to the uplink control configuration information; and the user equipment 23, configured to receive the uplink control configuration information sent by the first network device 21 or the second network device 22, receive, on a second carrier according to the uplink control configuration information, the control information sent by the second network device 22, and control, according to the control information sent by the second network device 22, the uplink transmission action of the user equipment 23 on the first carrier.

Optionally, the first network device 21 is a radio network controller (RNC), and the second network device 22 is a base station.

In this embodiment of the present invention, the first carrier and the second carrier are two different carriers. The first carrier may be a primary carrier, and the second carrier may be a secondary carrier. Alternatively, the first carrier may be a secondary carrier, and the second carrier is a primary carrier. Alternatively, the first carrier is a primary carrier, and the second carrier is a non-working carrier of the UE, and carries only the control channel and does not carry uplink and downlink data channels. In the following embodiments of the present invention, mainly a scenario in which the first carrier is a primary carrier and the second carrier is a secondary carrier is specifically described.

In a specific implementation, an example in which the first network device 21 is an RNC and the second network device 22 is a micro base station is used. In this embodiment of the present invention, it may be configured that the micro base station sends, on a secondary carrier, control information for controlling an uplink transmission action of UE on a primary carrier. After determining to send uplink control configuration information of the control information on the secondary carrier, the RNC may directly send the uplink control configuration information to the UE, or may instruct the micro base station, which needs to perform uplink control on the UE, to send the uplink control configuration information to the UE. If the micro base station is not controlled by the RNC, the RNC may further send the uplink control configuration information to another RNC that controls the micro base station, and the another RNC sends the uplink control configuration information to the micro base station. The micro base station then sends the uplink control configuration information to the UE, or the another RNC directly sends the uplink control configuration information to the UE, which is not limited herein. After receiving the uplink control configuration information, the UE may receive, according to the instruction of the uplink control configuration information, for example, on a control channel configured by the RNC, the control information sent by the micro base station, and adjust the uplink transmission action of the UE according to the control information. In this way, when the UE is not within primary carrier signal coverage of the micro base station, the micro base station may further control, by using the secondary carrier, the uplink transmission action of the UE on the primary carrier. When the foregoing second network device 22 is a macro base station, the method in this embodiment of the present invention may also be used, which is not limited herein.

Optionally, the control information includes power control information for controlling an uplink transmit power of the user equipment 23, where the control channel includes a first control channel used to send the power control information; and/or the control information includes feedback information for uplink data that is sent by the user equipment 23 to the second network device 22 on the first carrier, where the control channel includes a second control channel used to send the feedback information.

It should be noted that, the foregoing power control information may be information for directly instructing the UE to perform power adjustment, or may be grant information for a transmit power requested by the UE.

Optionally, the first control channel includes at least one of an E-DCH absolute grant channel (E-AGCH), an E-DCH relative grant channel (E-RGCH), or a fractional dedicated physical channel (F-DPCH).

The second control channel includes an E-DCH HARQ acknowledgment indicator channel (E-HICH).

The foregoing absolute grant channel, relative grant channel, and acknowledgment indicator channel are all enhanced dedicated channels (E-DCH), and the foregoing HARQ is a hybrid automatic repeat request, the full name being Hybrid Automatic Repeat Request.

In this embodiment of the present invention, if an E-DCH is configured on the second carrier, the control channel in this embodiment of the present invention does not include an existing uplink control channel for controlling the uplink transmission action of the UE on the second carrier.

Optionally, if the control information includes the power control information, the user equipment 23 adjusts the uplink transmit power of the user equipment 23 according to the power control information.

If the control information includes the feedback information, the user equipment 23 determines, according to the feedback information sent by the second network device 22, whether the second network device 22 correctly receives the uplink data sent by the user equipment 23.

In this embodiment of the present invention, the controlling the uplink transmission action of the UE may include controlling an uplink transmit power of the UE, or may include controlling the UE to send uplink data, or the like. For example, after the UE sends uplink data to the micro base station, if the UE does not receive acknowledgment (ACK) or negative acknowledgment (NCK) information fed back by the micro base station, the UE may send the uplink data again, resulting in multiple times of unnecessary data retransmission actions. By means of this embodiment of the present invention, the micro base station may send the fed-back ACK information on the foregoing second control channel. In this way, the UE that receives the ACK information does not perform unnecessary data retransmission.

Optionally, the system further includes: a third network device 24, configured to send, on the first carrier to the user equipment 23, the control information for controlling the uplink transmission action of the user equipment 23 on the first carrier.

In a specific implementation, the UE not only controls the uplink transmission action of the UE by considering only the control information that is sent by the second network device on the second carrier, but also may consider both the control information sent by the second network device on the second carrier and control information sent, on the first carrier, by a third network device managed by the first network device.

The UE controls the uplink transmission action of the UE on the first carrier according to the control information sent by the second network device and control information that is sent by a third network device managed by the first network device and that is received on the first carrier.

Optionally, if the control information includes the power control information, when either power control information of the power control information sent by the second network device 22 and the power control information sent by the third network device 24 instructs the user equipment 23 to reduce the uplink transmit power, the user equipment 23 reduces the uplink transmit power of the user equipment 23.

If the control information includes the feedback information, when either feedback information of the feedback information sent by the second network device 22 and feedback information sent by the third network device 24 includes acknowledgment ACK information, the user equipment 23 determines that the uplink data of the user equipment 23 is sent successfully.

In a specific implementation, an example in which the first network device is an RNC, the second network device is a micro base station, and the third network device is a macro base station is used. The UE not only receives, on the second carrier, the control information, for the uplink transmission action of the UE on the first carrier, sent by the micro base station, but also may receive, on the first carrier, control information, for the uplink transmission action of the UE on the first carrier, sent by a macro base station managed by the RNC. In this case, the UE controls the uplink transmission action of the UE on the first carrier according to the control information that is sent by the micro base station and that is received on the second carrier and the control information that is sent by the macro base station and that is received on the first carrier. If the control information received by the UE on the first carrier and the second carrier includes the power control information, when either power control information of the power control information sent by the micro base station and the power control information sent by the macro base station instructs the UE to reduce the uplink transmit power, the UE reduces the uplink transmit power of the UE, and when both the power control information sent by the micro base station and the power control information sent by the macro base station instruct the UE to increase the uplink transmit power, the UE increases the uplink transmit power of the UE. If the control information includes the feedback information, when either feedback information of the feedback information sent by the micro base station and the feedback information sent by the macro base station includes ACK information, the UE determines that the uplink data of the UE is sent successfully.

For example, the first carrier is a primary carrier, and the second carrier is a secondary carrier. The UE receives, on the secondary carrier, uplink control information for the primary carrier that is sent by the micro base station, and also receives, on the primary carrier, uplink control information for the primary carrier that is sent by the macro base station. If the UE receives the uplink control information for the primary carrier on both the primary carrier and the secondary carrier, the UE determines the uplink transmission action of the UE on the primary carrier according to the two pieces of uplink control information. For example, the UE determines whether at least one piece of E-HICH information of the E-HICH information for the primary carrier that is received on the primary carrier and the E-HICH information for the primary carrier that is received on the secondary carrier includes ACK information. If yes, the UE considers that the uplink data of the UE on the primary carrier is sent successfully, and determines not to retransmit uplink data any longer. The UE determines whether power control information on one carrier of power control information for the primary carrier that is received on the primary carrier and power control information for the primary carrier that is received on the secondary carrier instructs the UE to reduce the uplink transmit power. If power control information on one carrier instructs the UE to reduce the uplink transmit power, the UE reduces the uplink transmit power of the UE on the primary carrier. The UE increases the uplink transmit power of the UE only when the power control information for the primary carrier that is received on the primary carrier and the power control information for the primary carrier that is received on the secondary carrier both instruct the UE to increase the uplink transmit power.

In an actual implementation, if the UE receives the uplink control information on both the primary carrier and the secondary carrier, the UE may not necessarily consider both the control information on the primary carrier and the control information on the secondary carrier. For example, it may be configured that when the UE receives the uplink control information on both the primary carrier and the secondary carrier, the UE controls the uplink transmission action of the UE according to only the uplink control information received on the primary carrier or according to only the uplink control information received on the secondary carrier. In a specific implementation, after the control channel for receiving the uplink control information by the UE on the primary carrier and the secondary carrier is configured, which manner is to be used to control the uplink transmission action of the UE may be specifically notified to the UE by using physical layer signaling.

Optionally, before receiving the uplink control configuration information, the user equipment 23 reports supported capability information of the UE.

Correspondingly, after receiving the supported capability information reported by the user equipment 23, the first network device 21 determines, according to the supported capability information of the user equipment 23, whether the user equipment 23 supports reception of the control information on the second carrier. If the user equipment 23 supports reception of the control information on the second carrier, the uplink control configuration information is then configured for the user equipment 23.

In a process of specific implementation, the UE may report the supported capability information of the UE to the RNC. For example, the supported capability information may include information about whether the UE supports or does not support reception of the control information, sent by the micro base station, on the secondary carrier. After determining that the UE supports reception of the control information, sent by the micro base station, on the second carrier, the RNC then determines the uplink control configuration information for the UE. The UE also may not report the supported capability information of the UE to the RNC. In this case, the RNC takes by default that in a deployment scenario such as DF-DC, DF-3C, or DF-4C, UE that has a capability of DF-DC, DF-3C or DF-4C supports reception of the control information, sent by the micro base station, on the second carrier.

Optionally, before receiving the control information on the second carrier according to the uplink control configuration information, the user equipment 23 receives reception indication information sent by the second network device 22, where the reception indication information is used to instruct the user equipment 23 to receive the control information on the second carrier.

In a process of specific implementation, after receiving the uplink control configuration information, the UE determines that the control information sent by the second network device may be received according to the control channel indicated in the uplink control configuration information. Subsequently, after determining that the control information needs to be sent to the UE, the second network device may send reception indication information to the UE, and after receiving the reception indication information, the UE is handed off to the second carrier to receive the control information.

Optionally, when determining that one or more of the following conditions are met, the first network device 21 determines the uplink control configuration information, or, when determining that one or more of the following conditions are met, the second network device 22 sends the control information to the user equipment 23:

a signal measurement result of the user equipment 23 meets an event of a signal measurement report of a primary carrier or a secondary carrier;

the user equipment 23 enters a region between an uplink balance of the first carrier and a downlink balance of the first carrier;

an uplink serving cell and a downlink serving cell of the user equipment 23 are different cells, and the second network device 22 provides a service to the uplink serving cell;

a value of uplink interference to the second network device 22 from the user equipment 23 exceeds a set interference threshold value;

a load of the second carrier exceeds a specified load threshold value; or a current primary carrier cannot be switched from the first carrier to the second carrier.

In a process of specific implementation, the first network device may determine the uplink control configuration information for the UE in advance, and send the uplink control configuration information to the UE, or may determine the uplink control configuration information for the UE after the second network device needs to perform uplink signal control on the UE, and send the uplink control configuration information to the UE. When the first network device determines the uplink control configuration information for the UE in advance, the second network device may send the control information to the UE when it is determined, according to the foregoing condition, that uplink signal control needs to be performed on the UE. The performing uplink signal control on the UE by the second network device may include controlling the uplink transmit power of the UE. For example, when a signal measurement result of the UE meets an event (for example, a 1A event) of a signal measurement report of a primary carrier or a secondary carrier, uplink signal control is performed on the UE by using this embodiment of the present invention. For another example, when the UE enters an uplink-downlink imbalance region, that is, enters a region between an uplink balance for a primary carrier and a downlink balance for a primary carrier, it may be determined that uplink power control needs to be performed on the UE. Because a transmit power of the micro base station (the second network device) is relatively low, when the UE enters the uplink-downlink imbalance region from the uplink balance, a downlink of the micro base station does not meet the 1A event, and the micro base station cannot be added to an active set of the UE. Even if a cell individual offset (CIO) is extended to enable the micro base station to be added to the active set of the UE, the UE still cannot receive a power control command sent by the micro base station, that is, the micro base station cannot control the uplink transmit power of the UE on the primary carrier and is subject to strong uplink interference from the UE, and an uplink capacity of the UE is reduced. In this case, uplink power control on the UE by the micro base station may be implemented by using this embodiment of the present invention. For another example, if a value of uplink interference from the UE to the second network device exceeds a set interference threshold value, the micro base station is subject to strong uplink interference from the UE, and uplink power control needs to be performed on the UE. The performing uplink signal control on the UE by the second network device may also include controlling the UE to send uplink data. For example, after uplink decoupling is performed, the uplink serving cell and the downlink serving cell of the UE are different cells. For example, downlink transmission of the UE takes place at the macro base station, uplink reception takes place at the micro base station, and the UE cannot receive downlink control information sent by the micro base station. For example, after the UE sends uplink data to the micro base station, the UE cannot receive the acknowledgment information that is fed back by the micro base station on the E-HICH, and the UE continuously performs data retransmission, and as a result, it cannot be ensured that a service of the UE works normally.

In a process of specific implementation, if uplink interference on the current primary carrier (the first carrier) to the micro base station from the UE is relatively large, the primary carrier may be switched from the first carrier to the second carrier to avoid interference. However, if a load of the second carrier exceeds a specified load threshold value, the primary carrier cannot be switched, or, because downlink quality of the second carrier is relatively poor, switching of the primary carrier from the first carrier to the second carrier fails. In this case, uplink power control may be performed on the UE by using this embodiment of the present invention, to avoid interference.

Optionally, in the foregoing embodiment, it may be determined, in the following manners, whether the user equipment 23 enters an uplink-downlink imbalance region from the uplink balance:

It may be determined, according to a radio signal measurement event of a cell on the primary carrier or the secondary carrier, whether the UE enters an uplink-downlink imbalance region from the uplink balance. A radio signal measurement quantity of the radio signal measurement event may be a received signal code power (RSCP), a ratio of energy per chip to noise (Ec/No), a path loss, or the like. In a specific implementation, a threshold of an intra-frequency measurement event may be configured on the primary carrier or the secondary carrier. The secondary carrier is used as an example, and a threshold value for an event such as 1A or 1D may be configured for the UE. When the UE enters the uplink balance from a macro cell, reporting of a 1A or 1D event by a micro cell is triggered, and after receiving the 1A or 1D event, the first network device determines that the UE enters the uplink-downlink imbalance region.

Based on a same inventive concept, the embodiments of the present invention further provide the following uplink signal control apparatus and method. Because the principle of problem resolving in these apparatuses and methods is similar to that in the foregoing system, for implementations of these apparatuses, refer to the implementation of the system, and repetitive content is no longer described in detail.

Figure 3:
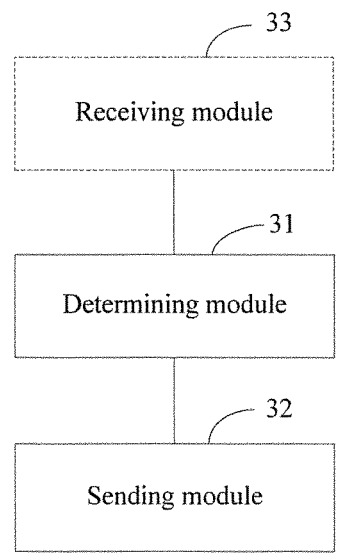
FIG. 3 is a schematic structural diagram of an uplink signal control apparatus according to Embodiment 1 of the present invention.

FIG. 3 is a schematic structural diagram of an uplink signal control apparatus according to Embodiment 1 of the present invention. The uplink signal control apparatus may be the first network device itself in the foregoing system, or may be disposed in the foregoing first network device, and includes:

a determining module 31, configured to determine uplink control configuration information for user equipment (UE), and transmit the determined uplink control configuration information to a sending module 32, where the uplink control configuration information includes information about a control channel occupied by control information, which is transmitted by a second network device on a second carrier, for controlling an uplink transmission action of the UE on a first carrier; and the sending module 32, configured to notify, to the second network device, the uplink control configuration information determined by the determining module 31, and send the uplink control configuration information to the UE or instruct the second network device to send the uplink control configuration information to the UE.

Optionally, the first carrier is a primary carrier, and the second carrier is a secondary carrier.

Optionally, the uplink signal control apparatus is a radio network controller (RNC), and the second network device is a base station.

Optionally, the control information includes power control information for controlling an uplink transmit power of the UE, and the control channel includes a first control channel used to send the power control information; and/or the control information includes feedback information for uplink data that is sent by the UE to the second network device on the first carrier, and the control channel includes a second control channel used to send the feedback information.

Optionally, the first control channel includes at least one of an enhanced dedicated channel-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

Optionally, the apparatus further includes: a receiving module 33, configured to: before the determining module 31 determines the uplink control configuration information, receive supported capability information reported by the UE, and transmit the received supported capability information to the determining module 31; and the determining module 31 is further configured to: before the uplink control configuration information is determined, determine, according to the supported capability information, that the UE supports reception of the control information on the second carrier.

Optionally, the determining module 31 specifically configured to: when one or more of the following conditions are met, determine the uplink control configuration information:

a signal measurement result of the UE meets an event of a signal measurement report of a primary carrier or a secondary carrier;

the UE enters a region between an uplink balance of the first carrier and a downlink balance of the first carrier;

an uplink serving cell and a downlink serving cell of the UE are different cells, and the second network device provides a service to the uplink serving cell;

a value of uplink interference from the UE to the second network device exceeds a set interference threshold value;

a load of the second carrier exceeds a specified load threshold value; or a current primary carrier cannot be switched from the first carrier to the second carrier.

Figure 4:
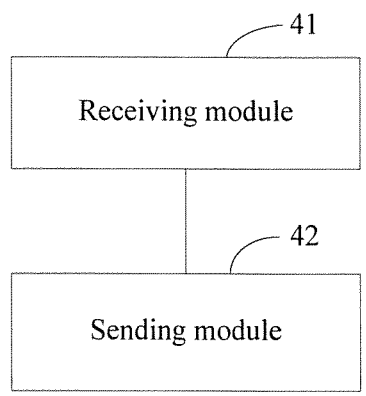
FIG. 4 is a schematic structural diagram of an uplink signal control apparatus according to Embodiment 2 of the present invention.

FIG. 4 is a schematic structural diagram of an uplink signal control apparatus according to Embodiment 2 of the present invention. The apparatus may be the second network device itself in the foregoing system, or may be disposed in the foregoing second network device, and includes:

a receiving module 41, configured to receive uplink control configuration information sent by a first network device, and transmit the received uplink control configuration information to a sending module 42, where the uplink control configuration information includes information about a control channel occupied by control information, which is transmitted by the sending module 42 on a second carrier, for controlling an uplink transmission action of user equipment (UE) on a first carrier; and the sending module 42, configured to send the control information to the UE on the second carrier according to the uplink control configuration information received by the receiving module 41.

Optionally, the sending module 42 is further configured to: before the control information is sent to the UE, send the uplink control configuration information to the UE.

Optionally, the first carrier is a primary carrier, and the second carrier is a secondary carrier.

Optionally, the first network device is a radio network controller (RNC), and the uplink signal control apparatus is a base station.

Optionally, the control information includes power control information for controlling an uplink transmit power of the UE, and the control channel includes a first control channel used to send the power control information; and/or, the control information includes feedback information for uplink data that is sent by the UE to the uplink signal control apparatus on the first carrier, and the control channel includes a second control channel used to send the feedback information.

Optionally, the first control channel includes at least one of an enhanced dedicated channel-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

Optionally, the sending module 42 is further configured to: after the receiving module 41 receives the uplink control configuration information, before the control information is sent to the UE, and after the control information needs to be sent to the UE, send reception indication information to the UE, where the reception indication information is used to instruct the UE to receive the control information on the second carrier.

Optionally, the sending module 42 is specifically configured to: when one or more of the following conditions are met, send the control information to the UE on the second carrier:

a signal measurement result of the UE meets an event of a signal measurement report of a primary carrier or a secondary carrier;

the UE enters a region between an uplink balance of the first carrier and a downlink balance of the first carrier;

an uplink serving cell and a downlink serving cell of the UE are different cells, and the uplink signal control apparatus provides a service to the uplink serving cell;

a value of uplink interference to the uplink signal control apparatus from the UE exceeds a set interference threshold value;

a load of the second carrier exceeds a specified load threshold value; or a current primary carrier cannot be switched from the first carrier to the second carrier.

Figure 5:
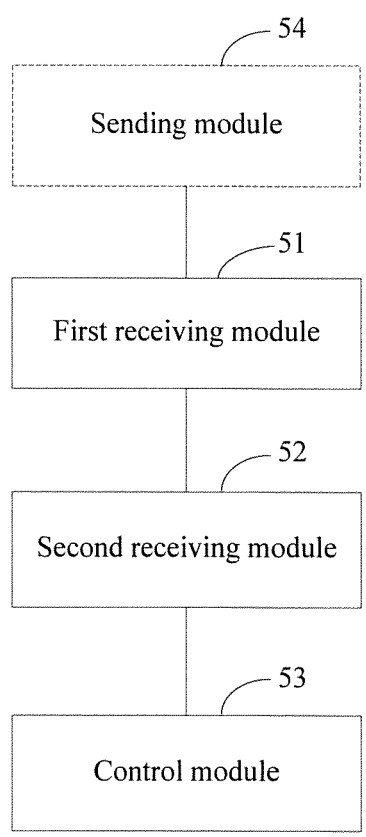
FIG. 5 is a schematic structural diagram of user equipment (UE) according to Embodiment 3 of the present invention.

FIG. 5 is a schematic structural diagram of user equipment (UE) according to Embodiment 3 of the present invention. The UE includes:

a first receiving module 51, configured to receive uplink control configuration information determined and sent by a first network device or receive uplink control configuration information sent by a second network device, and transmit the received uplink control configuration information to a second receiving module 52, where the uplink control configuration information includes information about a control channel occupied by control information, which is transmitted by the second network device on a second carrier, for controlling an uplink transmission action of the UE on a first carrier;

the second receiving module 52, configured to receive, according to the uplink control configuration information received by the first receiving module 51, the control information that is sent by the second network device on the second carrier, and transmit the received control information to a control module 53; and the control module 53, configured to control the uplink transmission action of the UE on the first carrier according to the control information received by the second receiving module 52.

Optionally, the first carrier is a primary carrier, and the second carrier is a secondary carrier.

Optionally, the first network device is a radio network controller (RNC), and the second network device is a base station.

Optionally, the control information includes power control information for controlling an uplink transmit power of the UE, and the control channel includes a first control channel used to send the power control information; and/or the control information includes feedback information for uplink data that is sent by the UE to the second network device on the first carrier, and the control channel includes a second control channel used to send the feedback information.

Optionally, the first control channel includes at least one of an enhanced dedicated channel-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

Optionally, if the control information includes the power control information, the control module 53 is specifically configured to adjust the uplink transmit power of the UE according to the power control information; and if the control information includes the feedback information, the control module 53 is specifically configured to determine, according to the feedback information sent by the second network device, whether the second network device correctly receives the uplink data sent by the UE.

Optionally, the second receiving module 52 is further configured to receive, on the first carrier, control information sent by a third network device managed by the first network device, and transmit, to the control module, the control information sent by the third network device 53; and the control module 53 is specifically configured to control the uplink transmission action of the UE on the first carrier according to the control information sent by the second network device and the control information sent by the third network device.

Optionally, if the control information includes the power control information, the control module 53 is specifically configured to: when either power control information of the power control information sent by the second network device and the power control information sent by the third network device instructs the UE to reduce the uplink transmit power, reduce the uplink transmit power of the UE; and if the control information includes the feedback information, the control module 53 is specifically configured to: when either feedback information of feedback information sent by the second network device and feedback information sent by the third network device includes acknowledgment ACK information, determine that the uplink data of the UE is sent successfully.

Optionally, the apparatus further includes:

a sending module 54, configured to: before the first receiving module 51 receives the uplink control configuration information, report supported capability information of the UE, to notify the first network device that the UE supports reception of the control information on the second carrier.

Optionally, the second receiving module 52 is further configured to: before the control information is received on the second carrier, receive reception indication information sent by the second network device, where the reception indication information is used to instruct the UE to receive the control information on the second carrier.

Figure 6:
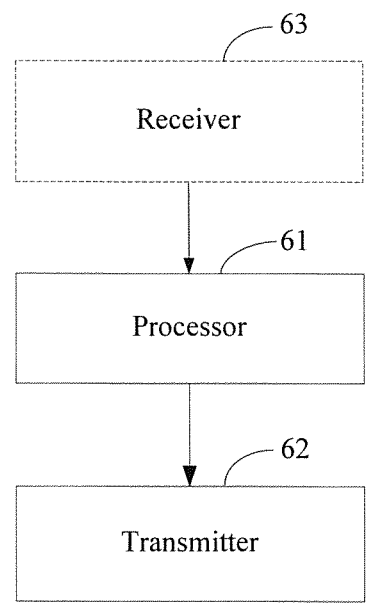
FIG. 6 is a schematic structural diagram of an uplink signal control apparatus according to Embodiment 4 of the present invention.

FIG. 6 is a schematic structural diagram of an uplink signal control apparatus according to Embodiment 4 of the present invention. The uplink signal control apparatus includes:

a processor 61, configured to determine uplink control configuration information for user equipment (UE), and transmit the determined uplink control configuration information to a transmitter 62, where the uplink control configuration information includes information about a control channel occupied by control information, which is transmitted by a second network device on a second carrier, for controlling an uplink transmission action of the UE on a first carrier; and the transmitter 62, configured to notify, to the second network device, the uplink control configuration information determined by the processor 61, and send the uplink control configuration information to the UE or instruct the second network device to send the uplink control configuration information to the UE.

Optionally, the first carrier is a primary carrier, and the second carrier is a secondary carrier.

Optionally, the uplink signal control apparatus is a radio network controller (RNC), and the second network device is a base station.

Optionally, the control information includes power control information for controlling an uplink transmit power of the UE, and the control channel includes a first control channel used to send the power control information; and/or the control information includes feedback information for uplink data that is sent by the UE to the second network device on the first carrier, and the control channel includes a second control channel used to send the feedback information.

Optionally, the first control channel includes at least one of an enhanced dedicated channel-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

Optionally, the uplink signal control apparatus further includes: a receiver 63, configured to: before the processor 61 determines the uplink control configuration information, receive supported capability information reported by the UE, and transmit the received supported capability information to the processor 61; and the processor 61 is further configured to: before the uplink control configuration information is determined, determine, according to the supported capability information, that the UE supports reception of the control information on the second carrier.

Optionally, the processor 61 is specifically configured to: when one or more of the following conditions are met, determine the uplink control configuration information:

a signal measurement result of the UE meets an event of a signal measurement report of a primary carrier or a secondary carrier;

the UE enters a region between an uplink balance of the first carrier and a downlink balance of the first carrier;

an uplink serving cell and a downlink serving cell of the UE are different cells, and the second network device provides a service to the uplink serving cell;

a value of uplink interference from the UE to the second network device exceeds a set interference threshold value;

a load of the second carrier exceeds a specified load threshold value; or a current primary carrier cannot be switched from the first carrier to the second carrier.

Figure 7:
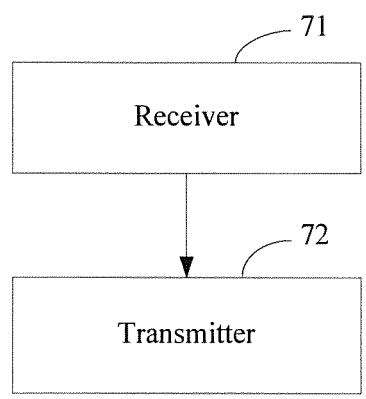
FIG. 7 is a schematic structural diagram of an uplink signal control apparatus according to Embodiment 5 of the present invention.

FIG. 7 is a schematic structural diagram of an uplink signal control apparatus according to Embodiment 5 of the present invention. The uplink signal control apparatus includes:

a receiver 71, configured to receive uplink control configuration information sent by a first network device, and transmit the received uplink control configuration information to a transmitter 72, where the uplink control configuration information includes information about a control channel occupied by control information, which is transmitted by the transmitter on a second carrier, for controlling an uplink transmission action of user equipment (UE) on a first carrier; and the transmitter 72, configured to send the control information to the UE on the second carrier according to the uplink control configuration information received by the receiver 71.

Optionally, the transmitter 72 is further configured to: before the control information is sent to the UE, send the uplink control configuration information to the UE.

Optionally, the first carrier is a primary carrier, and the second carrier is a secondary carrier.

Optionally, the first network device is a radio network controller (RNC), and the uplink signal control apparatus is a base station.

Optionally, the control information includes power control information for controlling an uplink transmit power of the UE, and the control channel includes a first control channel used to send the power control information; and/or the control information includes feedback information for uplink data that is sent by the UE to the uplink signal control apparatus on the first carrier, and the control channel includes a second control channel used to send the feedback information.

Optionally, the first control channel includes at least one of an enhanced dedicated channel-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

Optionally, the transmitter 72 is further configured to: after the receiver 71 receives the uplink control configuration information, before the control information is sent to the UE, and after the control information needs to be sent to the UE, send reception indication information to the UE, where the reception indication information is used to instruct the UE to receive the control information on the second carrier.

Optionally, the transmitter 72 is specifically configured to: when one or more of the following conditions are met, send the control information to the UE on the second carrier:

a signal measurement result of the UE meets an event of a signal measurement report of a primary carrier or a secondary carrier;

the UE enters a region between an uplink balance of the first carrier and a downlink balance of the first carrier;

an uplink serving cell and a downlink serving cell of the UE are different cells, and the uplink signal control apparatus provides a service to the uplink serving cell;

a value of uplink interference to the uplink signal control apparatus from the UE exceeds a set interference threshold value;

a load of the second carrier exceeds a specified load threshold value; or a current primary carrier cannot be switched from the first carrier to the second carrier.

Figure 8:
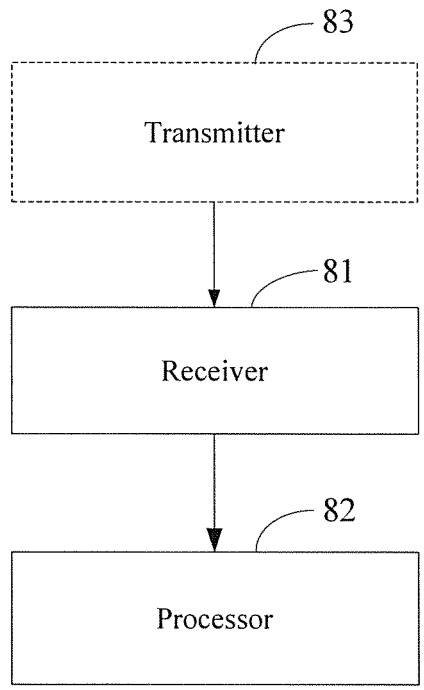
FIG. 8 is a schematic structural diagram of user equipment (UE) according to Embodiment 6 of the present invention.

FIG. 8 is a schematic structural diagram of user equipment (UE) according to Embodiment 6 of the present invention. The UE includes:

a receiver 81, configured to receive uplink control configuration information determined and sent by a first network device or receive uplink control configuration information sent by a second network device, receive, on a second carrier according to the received uplink control configuration information, control information sent by the second network device, and transmit the received control information to a processor 82, where the uplink control configuration information includes information about a control channel occupied by the control information, which is transmitted by the second network device on the second carrier, for controlling an uplink transmission action of the UE on a first carrier; and the processor 82, configured to control the uplink transmission action of the UE on the first carrier according to the control information received by the receiver 81.

Optionally, the first carrier is a primary carrier, and the second carrier is a secondary carrier.

Optionally, the first network device is a radio network controller (RNC), and the second network device is a base station.

Optionally, the control information includes power control information for controlling an uplink transmit power of the UE, and the control channel includes a first control channel used to send the power control information; and/or the control information includes feedback information for uplink data that is sent by the UE to the second network device on the first carrier, and the control channel includes a second control channel used to send the feedback information.

Optionally, the first control channel includes at least one of an enhanced dedicated channel-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

Optionally, if the control information includes the power control information, the processor 82 is specifically configured to adjust the uplink transmit power of the UE according to the power control information;

if the control information includes the feedback information, the processor 82 is specifically configured to determine, according to the feedback information sent by the second network device, whether the second network device correctly receives the uplink data sent by the UE.

Optionally, the receiver 81 is further configured to receive, on the first carrier, control information sent by a third network device managed by the first network device, and transmit, to the processor 82, the control information sent by the third network device; and the processor 82 is specifically configured to control the uplink transmission action of the UE on the first carrier according to the control information sent by the second network device and the control information sent by the third network device.

Optionally, if the control information includes the power control information, the processor 82 is specifically configured to: when either power control information of the power control information sent by the second network device and the power control information sent by the third network device instructs the UE to reduce the uplink transmit power, reduce the uplink transmit power of the UE; and if the control information includes the feedback information, the processor 82 is specifically configured to: when either feedback information of feedback information sent by the second network device and feedback information sent by the third network device includes acknowledgment ACK information, determine that the uplink data of the UE is sent successfully.

Optionally, the UE further includes:

a transmitter 83, configured to: before the receiver 81 receives the uplink control configuration information, report supported capability information of the UE, to notify the first network device that the UE supports reception of the control information on the second carrier.

Optionally, the receiver 81 is further configured to: before the control information is received on the second carrier, receive reception indication information sent by the second network device, where the reception indication information is used to instruct the UE to receive the control information on the second carrier.

Figure 9:
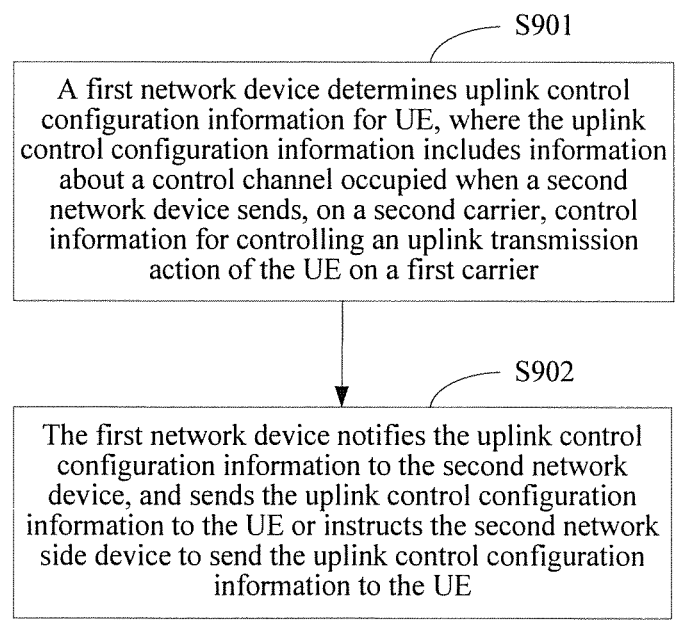
FIG. 9 is a flowchart of an uplink signal control method according to Embodiment 1 of the present invention.

FIG. 9 is a flowchart of an uplink signal control method according to Embodiment 1 of the present invention. The uplink signal control method includes the following steps:

S901: A first network device determines uplink control configuration information for UE, where the uplink control configuration information includes information about a control channel occupied by control information, which is transmitted by a second network device on a second carrier, for controlling an uplink transmission action of the UE on a first carrier.

S902: The first network device notifies the uplink control configuration information to the second network device, and sends the uplink control configuration information to the UE or instructs the second network device to send the uplink control configuration information to the UE.

Optionally, the first network device is a radio network controller (RNC), and the second network device is a base station.

In this embodiment of the present invention, the first carrier and the second carrier are two different carriers. The first carrier may be a primary carrier, and the second carrier may be a secondary carrier. Alternatively, the first carrier may be a secondary carrier, and the second carrier is a primary carrier. Alternatively, the first carrier is a primary carrier, and the second carrier is a non-working carrier of the UE, and carries only the control channel and does not carry uplink and downlink data channels. In the following embodiments of the present invention, mainly a scenario in which the first carrier is a primary carrier and the second carrier is a secondary carrier is specifically described.

In a specific implementation, an example in which the first network device is an RNC, and the second network device is a micro base station is used. In this embodiment of the present invention, it may be configured that the micro base station sends, on a secondary carrier, control information for controlling an uplink transmission action of UE on a primary carrier. After determining to send uplink control configuration information of the control information on the secondary carrier, the RNC may directly send the uplink control configuration information to the UE, or may instruct the micro base station that may need to perform uplink control on the UE to send the uplink control configuration information to the UE. If the micro base station is not controlled by the RNC, the RNC may further send the uplink control configuration information to another RNC that controls the micro base station, and the another RNC sends the uplink control configuration information to the micro base station. The micro base station then sends the uplink control configuration information to the UE, or the another RNC directly sends the uplink control configuration information to the UE, which is not limited herein. After receiving the uplink control configuration information, the UE may receive, according to the instruction of the uplink control configuration information, for example, on a control channel configured by the RNC, the control information sent by the micro base station, and adjust the uplink transmission action of the UE according to the control information. In this way, when the UE is not within primary carrier signal coverage of the micro base station. The micro base station may further control, by using the secondary carrier, uplink transmission of the UE on the primary carrier. When the foregoing second network device is a macro base station, the method in this embodiment of the present invention may also be used, which is not limited herein.

Optionally, the control information includes power control information for controlling an uplink transmit power of the UE, and the control channel includes a first control channel used to send the power control information; and/or, the control information includes feedback information for uplink data that is sent by the UE to the second network device on the first carrier, and the control channel includes a second control channel used to send the feedback information.

It should be noted that, the foregoing power control information may be information for directly instructing the UE to perform power adjustment, or may be grant information for a transmit power requested by the UE.

In this embodiment of the present invention, the controlling an uplink transmission action of the UE may include controlling an uplink transmit power of the UE, or may include controlling the UE to send uplink data, or the like. For example, after the UE sends uplink data to the micro base station, if the UE does not receive acknowledgment (ACK) or negative acknowledgment (NCK) information fed back by the micro base station, the UE may send the uplink data again, resulting in multiple times of unnecessary data retransmission actions. By means of this embodiment of the present invention, the micro base station may send the fed-back acknowledgment information on the foregoing second control channel. In this way, the UE that receives the acknowledgment information does not perform unnecessary data retransmission.

Optionally, the first control channel includes at least one of an E-DCH absolute grant channel (E-AGCH), an E-DCH relative grant channel (E-RGCH), or a fractional dedicated physical channel (F-DPCH).

The second control channel includes an E-DCH HARQ acknowledgment indicator channel (E-HICH).

The foregoing absolute grant channel, relative grant channel, and acknowledgment indicator channel are all enhanced dedicated channels (E-DCH), and the foregoing HARQ is a hybrid automatic repeat request, the full name being Hybrid Automatic Repeat Request.

In this embodiment of the present invention, if an enhanced dedicated channel (E-DCH) is configured on the second carrier, the control channel in this embodiment of the present invention does not include an existing uplink control channel for controlling the uplink transmission action of the UE on the second carrier.

In a process of specific implementation, the UE not only controls the uplink transmission action of the UE by considering only the control information that is sent by the second network device on the second carrier, but also may consider both the control information sent by the second network device on the second carrier and control information sent, on the first carrier, by a third network device managed by the first network device. That is, the UE controls the uplink transmission action of the UE on the first carrier according to the control information sent by the second network device and control information that is sent by a third network device managed by the first network device and that is received on the first carrier.

Specifically, if the control information includes the power control information, when either power control information of the power control information sent by the second network device and the power control information sent by the third network device instructs the UE to reduce the uplink transmit power, the UE reduces the uplink transmit power of the UE. When both the power control information sent by the second network device and the power control information sent by the third network device instruct the UE to increase the uplink transmit power, the UE increases the uplink transmit power of the UE. If the control information includes the feedback information, when either feedback information of feedback information sent by the second network device and feedback information sent by the third network device includes acknowledgment ACK information, the UE determines that the uplink data of the UE is sent successfully.

In a specific implementation, an example in which the first network device is an RNC, the second network device is a micro base station, and the third network device is a macro base station is used. The UE not only receives, on the second carrier, the control information, for the uplink transmission action of the UE on the first carrier, sent by the micro base station, but also may receive, on the first carrier, control information, for the uplink transmission action of the UE on the first carrier, sent by a macro base station managed by the RNC. In this case, the UE controls the uplink transmission action of the UE on the first carrier according to the control information that is sent by the micro base station and that is received on the second carrier and the control information that is sent by the macro base station and that is received on the first carrier. If the control information received by the UE on the first carrier and the second carrier includes the power control information, when either power control information of the power control information sent by the micro base station and the power control information sent by the macro base station instructs the UE to reduce the uplink transmit power, the UE reduces the uplink transmit power of the UE, and when both the power control information sent by the micro base station and the power control information sent by the macro base station instruct the UE to increase the uplink transmit power, the UE increases the uplink transmit power of the UE. If the control information includes the feedback information, when either feedback information of the feedback information sent by the micro base station and the feedback information sent by the macro base station includes acknowledgment ACK information, the UE determines that the uplink data of the UE is sent successfully.

For example, the first carrier is a primary carrier, and the second carrier is a secondary carrier. The UE receives, on the secondary carrier, uplink control information for the primary carrier that is sent by the micro base station, and also receives, on the primary carrier, uplink control information for the primary carrier that is sent by the macro base station. If the UE receives the uplink control information for the primary carrier on both the primary carrier and the secondary carrier, the UE determines the uplink transmission action of the UE on the primary carrier according to the two pieces of uplink control information. For example, the UE determines whether at least one piece of E-HICH information of the E-HICH information for the primary carrier that is received on the primary carrier and the E-HICH information for the primary carrier that is received on the secondary carrier includes acknowledgment (ACK) information. If yes, the UE considers that the uplink data of the UE on the primary carrier is sent successfully, and determines not to retransmit uplink data any longer. The UE determines whether power control information on one carrier of power control information for the primary carrier that is received on the primary carrier and power control information for the primary carrier that is received on the secondary carrier instructs the UE to reduce the uplink transmit power. If power control information on one carrier instructs the UE to reduce the uplink transmit power, the UE reduces the uplink transmit power of the UE on the primary carrier. The UE increases the uplink transmit power of the UE only when the power control information for the primary carrier that is received on the primary carrier and the power control information for the primary carrier that is received on the secondary carrier both instruct the UE to increase the uplink transmit power.

In an actual implementation, if the UE receives the uplink control information on both the primary carrier and the secondary carrier, the UE may not necessarily consider both the control information on the primary carrier and the control information on the secondary carrier. For example, it may be configured that when the UE receives the uplink control information on both the primary carrier and the secondary carrier, the UE controls the uplink transmission action of the UE according to only the uplink control information received on the primary carrier or according to only the uplink control information received on the secondary carrier. In a specific implementation, after the control channel for receiving the uplink control information by the UE on the primary carrier and the secondary carrier is configured, which manner is to be used to control the uplink transmission action of the UE may be specifically notified to the UE by using physical layer signaling.

Optionally, before the determining, by a first network device, uplink control configuration information, the method further includes:

receiving, by the first network device, supported capability information reported by the UE, and determining, according to the supported capability information, that the UE supports reception of the control information on the second carrier.

In a process of specific implementation, the UE may report the supported capability information of the UE to the RNC. For example, the supported capability information may include information about whether the UE supports or does not support reception of the control information, sent by the micro base station, on the secondary carrier. After determining that the UE supports reception of the control information, sent by the micro base station, on the second carrier, the RNC then determines the uplink control configuration information for the UE. The UE also may not report the supported capability information of the UE to the RNC. In this case, the RNC takes by default that in a deployment scenario such as DF-DC, DF-3C, or DF-4C, UE that has a capability of DF-DC, DF-3C or DF-4C supports reception of the control information, sent by the micro base station, on the second carrier.

Optionally, the determining, by a first network device, uplink control configuration information includes:

when one or more of the following conditions are met, determining, by the first network device, the uplink control configuration information:

a signal measurement result of the UE meets an event of a signal measurement report of a primary carrier or a secondary carrier;

the UE enters a region between an uplink balance of the first carrier and a downlink balance of the first carrier;

an uplink serving cell and a downlink serving cell of the UE are different cells, and the second network device provides a service to the uplink serving cell;

a value of uplink interference from the UE to the second network device exceeds a set interference threshold value;

a load of the second carrier exceeds a specified load threshold value; or a current primary carrier cannot be switched from the first carrier to the second carrier.

In a process of specific implementation, the first network device may determine the uplink control configuration information for the UE in advance, and send the uplink control configuration information to the UE, or may determine the uplink control configuration information for the UE after the second network device needs to perform uplink signal control on the UE, and send the uplink control configuration information to the UE. When the first network device determines the uplink control configuration information for the UE in advance, the second network device may send the control information to the UE when it is determined, according to the foregoing condition, that uplink signal control needs to be performed on the UE. The performing uplink signal control on the UE by the second network device may include controlling the uplink transmit power of the UE. For example, when a signal measurement result of the UE meets an event (for example, a 1A event) of a signal measurement report of a primary carrier or a secondary carrier, uplink signal control is performed on the UE by using this embodiment of the present invention. For another example, when the UE enters an uplink-downlink imbalance region, that is, enters a region between an uplink balance for a primary carrier and a downlink balance for a primary carrier, it may be determined that uplink power control needs to be performed on the UE. Because a transmit power of the micro base station (the second network device) is relatively low, when the UE enters the uplink-downlink imbalance region from the uplink balance, a downlink of the micro base station does not meet the 1A event, and the micro base station cannot be added to an active set of the UE. Even if a cell individual offset (CIO) is extended to enable the micro base station to be added to the active set of the UE, the UE still cannot receive a power control command sent by the micro base station, that is, the micro base station cannot control the uplink transmit power of the UE on the primary carrier and is subject to strong uplink interference from the UE, and an uplink capacity of the UE is reduced. In this case, uplink power control on the UE by the micro base station may be implemented by using this embodiment of the present invention. For another example, if a value of uplink interference from the UE to the second network device exceeds a set interference threshold value, the micro base station is subject to strong uplink interference from the UE, and uplink power control needs to be performed on the UE. The performing uplink signal control on the UE by the second network device may also include controlling the UE to send uplink data. For example, after uplink decoupling is performed, the uplink serving cell and the downlink serving cell of the UE are different cells. For example, downlink transmission of the UE takes place at the macro base station, uplink reception takes place at the micro base station, and the UE cannot receive downlink control information sent by the micro base station. For example, after the UE sends uplink data to the micro base station, the UE cannot receive the acknowledgment information that is fed back by the micro base station on the E-HICH, and the UE continuously performs data retransmission, and as a result, it cannot be ensured that a service of the UE works normally.

In a process of specific implementation, if uplink interference on the current primary carrier (the first carrier) to the micro base station from the UE is relatively large, the primary carrier may be switched from the first carrier to the second carrier to avoid interference. However, if a load of the second carrier exceeds a specified load threshold value, the primary carrier cannot be switched, or, because downlink quality of the second carrier is relatively poor, switching of the primary carrier from the first carrier to the second carrier fails. In this case, uplink power control may be performed on the UE by using this embodiment of the present invention, to avoid interference.

Optionally, in the foregoing embodiment, it may be determined, in the following manners, whether the UE enters an uplink-downlink imbalance region from the uplink balance:

It may be determined, according to a radio signal measurement event of a cell on the primary carrier or the secondary carrier, whether the UE enters an uplink-downlink imbalance region from the uplink balance. A radio signal measurement quantity of the radio signal measurement event may be an RSCP, an Ec/No, a path loss, or the like. In a specific implementation, a threshold of an intra-frequency measurement event may be configured on the primary carrier or the secondary carrier. The secondary carrier is used as an example, and a threshold for an event such as 1A or 1D may be configured for the UE. When the UE enters the uplink balance from a macro cell, reporting of a 1A or 1D event by a micro cell is triggered, and after receiving the 1A or 1D event, the first network device determines that the UE enters the uplink-downlink imbalance region.

Based on a same inventive concept, an embodiment of the present invention further provides the following uplink signal control method on a side of the second network device, for a specific implementation, refer to the foregoing embodiment, and repetitive content is no longer described in detail.

Figure 10:
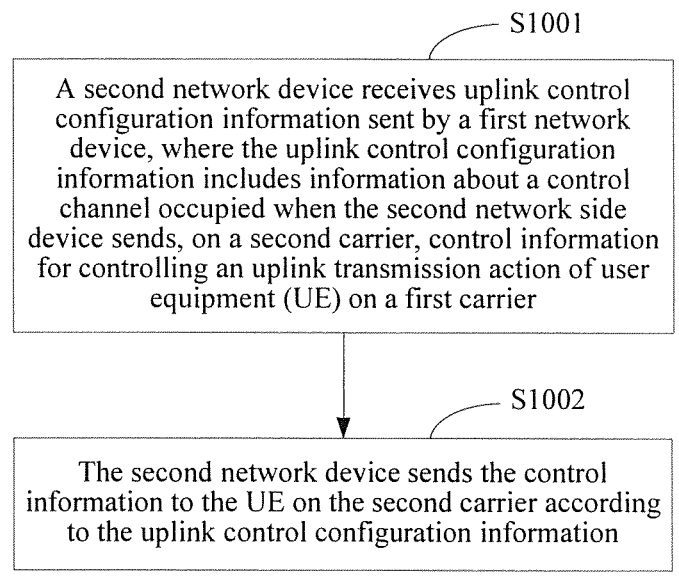
FIG. 10 is a flowchart of an uplink signal control method according to Embodiment 2 of the present invention.

FIG. 10 is a flowchart of an uplink signal control method according to Embodiment 2 of the present invention. The uplink signal control method includes:

S1001: A second network device receives uplink control configuration information sent by a first network device, where the uplink control configuration information includes information about a control channel occupied by control information, which is transmitted by the second network device on a second carrier, for controlling an uplink transmission action of user equipment (UE) on a first carrier.

S1002: The second network device sends the control information to the UE on the second carrier according to the uplink control configuration information.

Optionally, before the sending, by the second network device, the control information to the UE, the method further includes:

sending, by the second network device, the uplink control configuration information to the UE.

Optionally, the first carrier is a primary carrier, and the second carrier is a secondary carrier.

Optionally, the first network device is a radio network controller (RNC), and the second network device is a base station.

Optionally, the control information includes power control information for controlling an uplink transmit power of the UE, and the control channel includes a first control channel used to send the power control information; and/or the control information includes feedback information for uplink data that is sent by the UE to the second network device on the first carrier, and the control channel includes a second control channel used to send the feedback information.

Optionally, the first control channel includes at least one of an enhanced dedicated channel-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

Optionally, after the receiving, by a second network device, uplink control configuration information, and before the sending the control information to the UE, the method further includes:

after the control information needs to be sent to the UE, sending, by the second network device, reception indication information to the UE, where the reception indication information is used to instruct the UE to receive the control information on the second carrier.

Optionally, the sending, by the second network device, the control information to the UE on the second carrier includes:

when one or more of the following conditions are met, sending, by the second network device, the control information to the UE on the second carrier:

a signal measurement result of the UE meets an event of a signal measurement report of a primary carrier or a secondary carrier;

the UE enters a region between an uplink balance of the first carrier and a downlink balance of the first carrier;

an uplink serving cell and a downlink serving cell of the UE are different cells, and the second network device provides a service to the uplink serving cell;

a value of uplink interference from the UE to the second network device exceeds a set interference threshold value;

a load of the second carrier exceeds a specified load threshold value; or a current primary carrier cannot be switched from the first carrier to the second carrier.

In a process of specific implementation, if the first network device determines the uplink control configuration information for the UE in advance and sends the uplink control configuration information to the UE, the second network device may send the control information to the UE according to the uplink control configuration information when the foregoing conditions are met. If the first network device determines the uplink control configuration information for the UE only when the foregoing conditions are met and sends the uplink control configuration information to the UE, after receiving the uplink control configuration information determined by the first network device, the second network device may send the control information to the UE according to the uplink control configuration information.

Based on a same inventive concept, an embodiment of the present invention further provides the following uplink signal control method based on a side of UE. For a specific implementation, refer to the description of the foregoing embodiment, and repetitive content is no longer described in detail.

Figure 11:
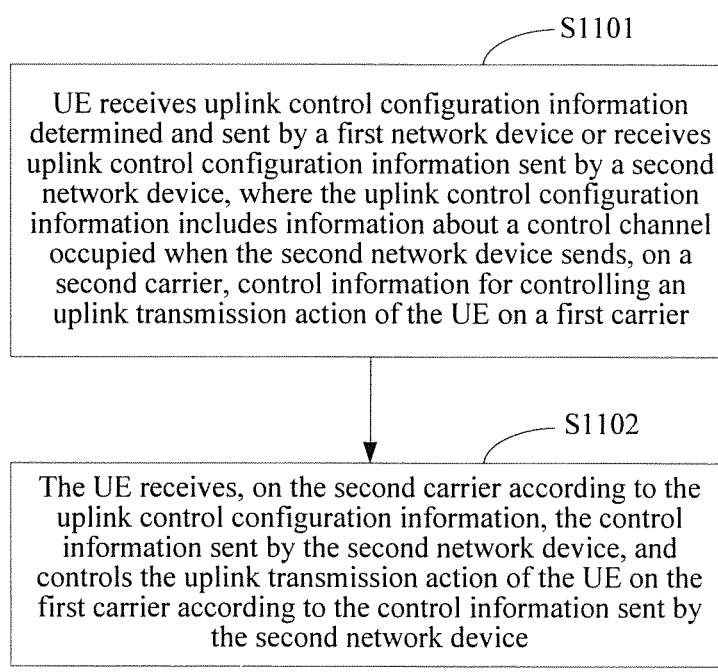
FIG. 11 is a flowchart of an uplink signal control method according to Embodiment 3 of the present invention.

FIG. 11 is a flowchart of an uplink signal control method according to Embodiment 3 of the present invention. The uplink signal control method includes:

S1101: UE receives uplink control configuration information determined and sent by a first network device or receives uplink control configuration information sent by a second network device, where the uplink control configuration information includes information about a control channel occupied by control information, which is transmitted by the second network device on a second carrier, for controlling an uplink transmission action of the UE on a first carrier.

S1102: The UE receives, on the second carrier according to the uplink control configuration information, the control information sent by the second network device, and controls the uplink transmission action of the UE on the first carrier according to the control information sent by the second network device.

Optionally, the first carrier is a primary carrier, and the second carrier is a secondary carrier.

Optionally, the first network device is an RNC, and the second network device is a micro base station.

Optionally, the control information includes power control information for controlling an uplink transmit power of the UE, and the control channel includes a first control channel used to send the power control information; and/or, the control information includes feedback information for uplink data that is sent by the UE to the second network device on the first carrier, and the control channel includes a second control channel used to send the feedback information.

Optionally, the first control channel includes at least one of an enhanced dedicated channel-absolute grant channel (E-AGCH), an E-DCH relative grant channel (E-RGCH), or a fractional dedicated physical channel (F-DPCH); and the second control channel includes: an E-DCH HARQ acknowledgment indicator channel (E-HICH).

Optionally, if the control information includes the power control information, the controlling, by the UE, the uplink transmission action of the UE on the first carrier according to the control information sent by the second network device includes: adjusting, by the UE, the uplink transmit power of the UE according to the power control information; and if the control information includes the feedback information, the controlling, by the UE, the uplink transmission action of the UE on the first carrier according to the control information sent by the second network device includes: determining, by the UE according to feedback information sent by the second network device, whether the second network device correctly receives the uplink data sent by the UE.

In a process of specific implementation, if the base station (the second network device) determines that uplink power control needs to be performed on the UE, the foregoing first control channel may be selected, and a transmit power adjustment indication is sent to the UE on the second carrier, to enable the UE to adjust the uplink transmit power of the UE. If uplink data that is sent by the UE and that needs a feedback acknowledgment is received, the foregoing second control channel may be selected, and feedback acknowledgment information is sent to the UE on the second carrier.

It should be noted that, the UE not only may receive, on the second carrier, the control information sent by the base station, but also may simultaneously receive, on the first carrier, control information sent by a macro base station. When the control information sent by the micro base station and the control information sent by the macro base station contradict each other, the UE uses a principle of reducing interference and reducing a quantity of times of retransmission. As long as either base station requires to reduce a transmit power, the UE reduces the transmit power of the UE. As long as acknowledgment information fed back by either base station is received, uplink data is sent successfully.

Optionally, the controlling, by the UE, the uplink transmission action of the UE on the first carrier according to the control information sent by the second network device includes:

controlling, by the UE, the uplink transmission action of the UE on the first carrier according to the control information sent by the second network device and control information that is sent by a third network device managed by the first network device and that is received on the first carrier.

Optionally, if the control information includes the power control information, the controlling, by the UE, the uplink transmission action of the UE on the first carrier includes: when either power control information of the power control information sent by the second network device and the power control information sent by the third network device instructs the UE to reduce the uplink transmit power, reducing, by the UE, the uplink transmit power of the UE; and if the control information includes the feedback information, the controlling, by the UE, the uplink transmission action of the UE on the first carrier includes: when either feedback information of feedback information sent by the second network device and feedback information sent by the third network device includes acknowledgment ACK information, determining, by the UE, that the uplink data of the UE is sent successfully.

Optionally, before the receiving, by UE, uplink control configuration information, the method further includes:

reporting, by the UE, supported capability information of the UE, to notify the first network device that the UE supports reception of the control information on the second carrier.

Optionally, before the receiving, by the UE on the second carrier according to the uplink control configuration information, the control information, the method further includes:

receiving, by the UE, reception indication information sent by the second network device, where the reception indication information is used to instruct the UE to receive the control information on the second carrier.

In a process of specific implementation, after receiving the uplink control configuration information, the UE determines that the control information sent by the second network device may be received according to the control channel indicated in the uplink control configuration information. Subsequently, after determining that the control information needs to be sent to the UE, the second network device may send reception indication information to the UE, and after receiving the reception indication information, the UE is handed off to the second carrier to receive the control information.

To further describe the uplink signal control method in this embodiment of the present invention, descriptions are further provided below by using specific embodiments.

Figure 12:
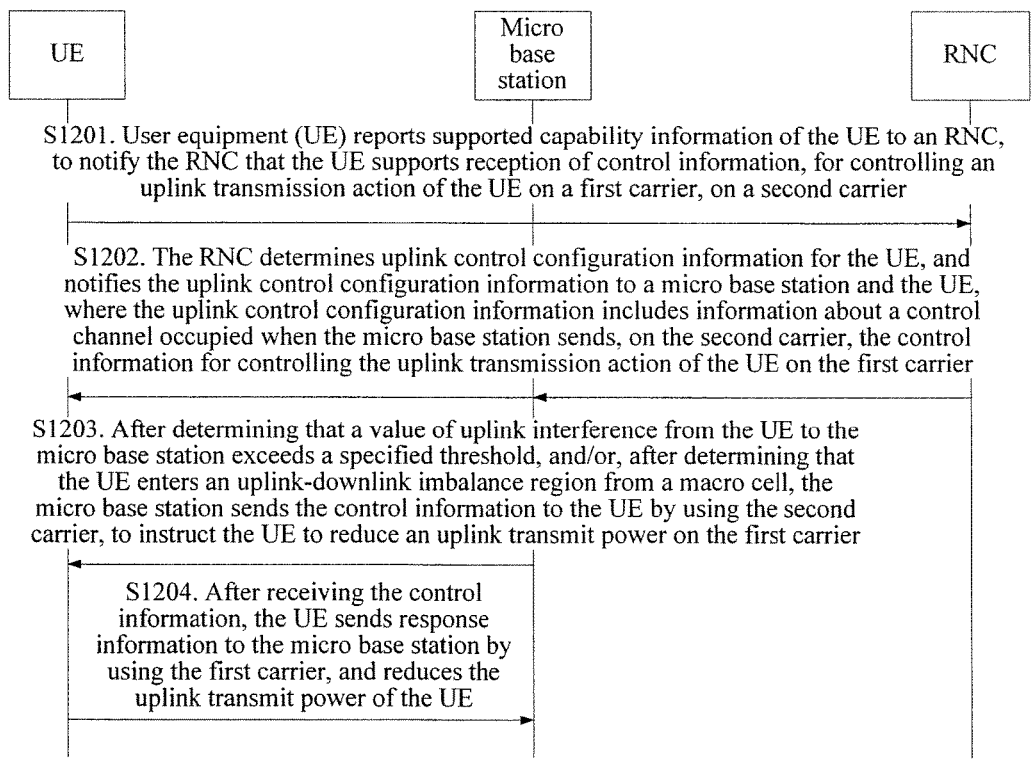
FIG. 12 is a flowchart of an uplink signal control method according to Embodiment 4 of the present invention.

FIG. 12 is a flowchart of an uplink signal control method according to Embodiment 4 of the present invention. The uplink signal control method includes:

S1201: User equipment (UE) reports supported capability information of the UE to an RNC, to notify the RNC that the UE supports reception of control information, for controlling an uplink transmission action of the UE on a first carrier, on a second carrier.

S1202: The RNC determines uplink control configuration information for the UE, and notifies the uplink control configuration information to a micro base station and the UE, where the uplink control configuration information includes information about the control channel occupied by control information, which is transmitted by the micro base station on the second carrier, for controlling the uplink transmission action of the UE on the first carrier.

S1203: After determining that a value of uplink interference from the UE to the micro base station exceeds a specified threshold, and/or, after determining that the UE enters an uplink-downlink imbalance region from a macro cell, the micro base station sends the control information to the UE by using the second carrier, to instruct the UE to reduce an uplink transmit power on the first carrier.

Figure 13:
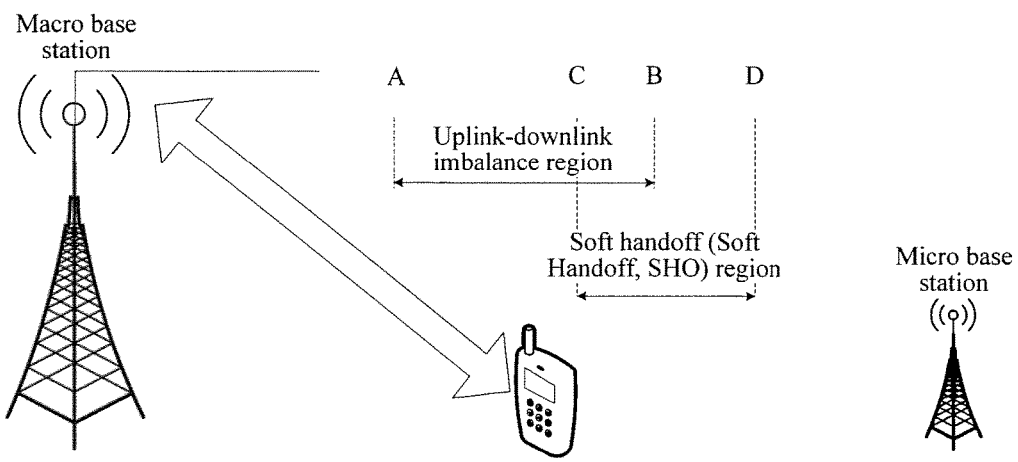
FIG. 13 is a schematic diagram showing that UE enters an uplink-downlink imbalance region according to an embodiment of the present invention.

FIG. 13 is a schematic diagram showing that the UE enters the uplink-downlink imbalance region in this embodiment of the present invention. In the figure, A is an uplink balance, B is a downlink balance, C is a point of triggering a 1A event, and D is a point of triggering a 1B event. Before C, the UE still cannot add the micro base station to an active set, and the micro base station also cannot perform uplink signal control on the UE.

S1204: After receiving the control information, the UE sends response information to the micro base station by using the first carrier, and reduces the uplink transmit power of the UE.

Figure 14:
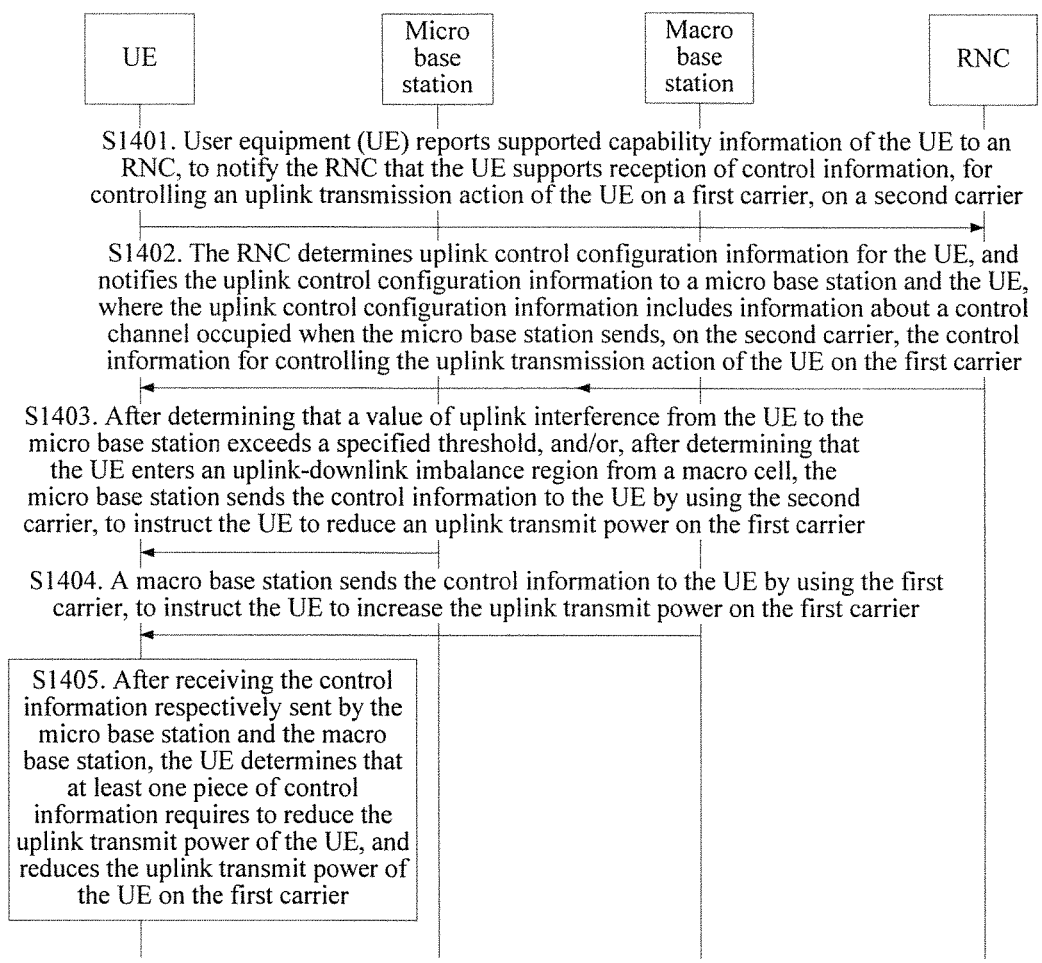
FIG. 14 is a flowchart of an uplink signal control method according to Embodiment 5 of the present invention.

FIG. 14 is a flowchart of an uplink signal control method according to Embodiment 6 of the present invention. The uplink signal control method includes:

S1401: User equipment (UE) reports supported capability information of the UE to an RNC, to notify the RNC that the UE supports reception of control information, for controlling an uplink transmission action of the UE on a first carrier, on a second carrier.

S1402: The RNC determines uplink control configuration information for the UE, and notifies the uplink control configuration information to a micro base station and the UE, where the uplink control configuration information includes information about a control channel occupied by the control information, which is transmitted by the micro base station on the second carrier, for controlling the uplink transmission action of the UE on the first carrier.

S1403: After determining that a value of uplink interference to the micro base station from the UE exceeds a specified threshold, and/or, after determining that the UE enters an uplink-downlink imbalance region from a macro cell, the micro base station sends the control information to the UE by using the second carrier, to instruct the LIE to reduce an uplink transmit power on the first carrier.

S1404: A macro base station sends the control information to the UE by using the first carrier, to instruct the UE to increase the uplink transmit power on the first carrier.

S1405: After receiving the control information respectively sent by the micro base station and the macro base station, the UE determines that at least one piece of control information requires to reduce the uplink transmit power of the UE, and reduces the uplink transmit power of the UE on the first carrier.

Figure 15:
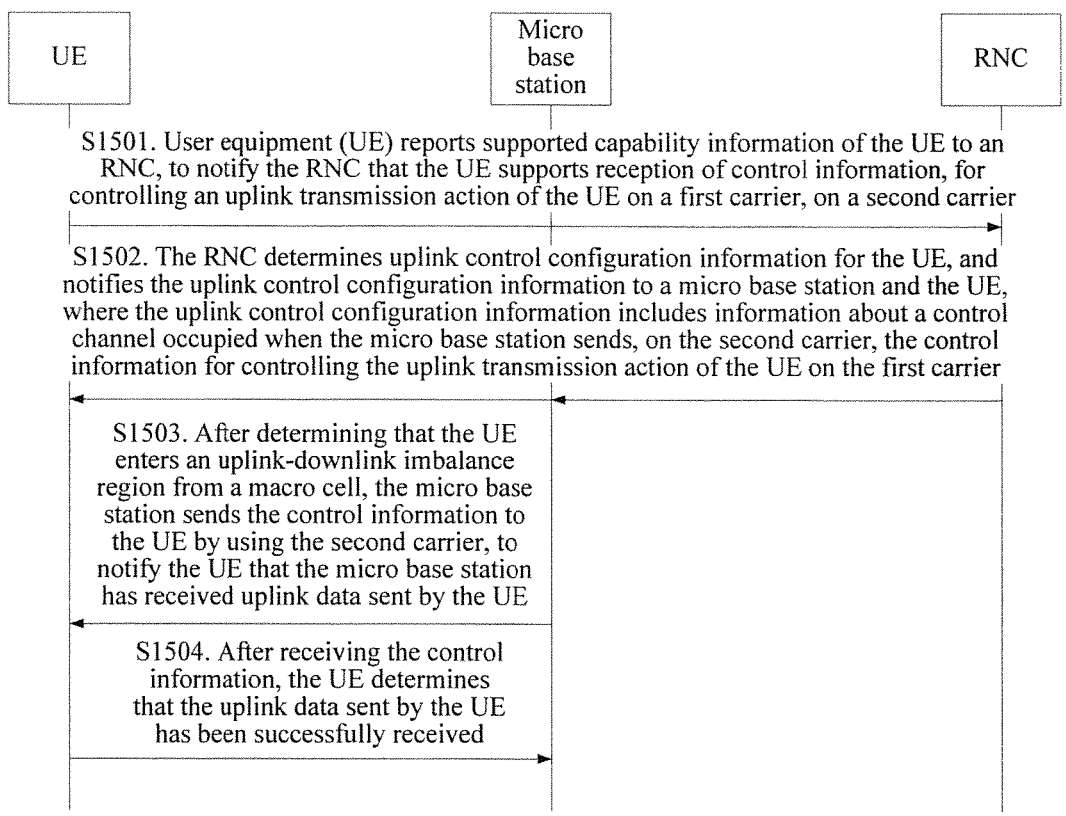
FIG. 15 is a flowchart of an uplink signal control method according to Embodiment 6 of the present invention.

FIG. 15 is a flowchart of an uplink signal control method according to Embodiment 5 of the present invention. The uplink signal control method includes:

S1501: User equipment (UE) reports supported capability information of the UE to an RNC, to notify the RNC that the UE supports reception of control information, for controlling an uplink transmission action of the UE on a first carrier, on a second carrier.

S1502: The RNC determines uplink control configuration information for the UE, and notifies the uplink control configuration information to a micro base station and the UE, where the uplink control configuration information includes information about a control channel occupied by the control information, which is transmitted by the micro base station on the second carrier, for controlling the uplink transmission action of the UE on the first carrier.

S1503: After determining that the UE enters an uplink-downlink imbalance region from a macro cell, the micro base station sends the control information to the UE by using the second carrier, to notify the UE that the micro base station has received uplink data sent by the UE.

S1504: After receiving the control information, the UE determines that the uplink data sent by the UE has been successfully received.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely used to describe the technical solutions of the present application. The foregoing embodiments are merely intended to help understand the method and core idea of the present invention, and shall not be construed as a limitation on the present invention. Any variation or replacement readily figured out by a person skilled in the art within the technical scope disclosed in the present invention shall fall within the protection scope of the present invention.

What is claimed is:

1. An uplink signal control apparatus of a first network device, the apparatus comprising:
   a processor configured to determine uplink control configuration information for user equipment (UE) in response to a determination that the UE enters a region between an uplink balance of a first carrier and a downlink balance of the first carrier, wherein the uplink control configuration information comprises information about a first control channel for sending power control information, which is transmitted by a second network device on a second carrier, for controlling an uplink transmit power of the UE on the first carrier, wherein the uplink balance of the first carrier corresponds to a first location of the UE where a signal transmitted by the UE on the first carrier is received by the first network device and the second network device with a same signal strength, and the downlink balance of the first carrier corresponds to a second location of the UE where a first signal transmitted by the first network device on the first carrier and a second signal transmitted by the second network device on the first carrier are received by the UE with a same signal strength, wherein the first control channel comprises at least one of an enhanced dedicated channel-absolute grant channel (E-AGCH), an E-DCH relative grant channel (E-RGCH), or a fractional dedicated physical channel (F-DPCH); and
   a transmitter configured to notify, to the second network device, the uplink control configuration information, and send the uplink control configuration information to the UE or instruct the second network device to send the uplink control configuration information to the UE.

2. The apparatus according to claim 1, wherein the uplink control configuration information further comprises information about a second control channel for sending feedback information for uplink data that is sent by the UE to the second network device on the first carrier.

3. The apparatus according to claim 1, the apparatus further comprising:
   a receiver, configured to, before the processor determines the uplink control configuration information, receive supported capability information reported by the UE; and
   the processor is further configured to, before the uplink control configuration information is determined, determine, according to the supported capability information, that the UE supports reception of the power control information on the second carrier.

4. An uplink signal control apparatus of a second network device, the apparatus comprising:
   a receiver configured to receive uplink control configuration information sent by a first network device, wherein the uplink control configuration information comprises information about a first control channel for sending power control information, which is transmitted on a second carrier, for controlling an uplink transmit power of user equipment (UE) on a first carrier, wherein the uplink control configuration information is determined in response to a determination that the UE enters a region between an uplink balance of the first carrier and a downlink balance of the first carrier, wherein the uplink balance of the first carrier corresponds to a first location of the UE where a signal transmitted by the UE on the first carrier is received by the first network device and the second network device with a same signal strength, and the downlink balance of the first carrier corresponds to a second location of the UE where a first signal transmitted by the first network device on the first carrier and a second signal transmitted by the second network device on the first carrier are received by the UE with a same signal strength, wherein the first control channel comprises at least one of an enhanced dedicated channel-absolute grant channel (E-AGCH), an E-DCH relative grant channel (E-RGCH), or a fractional dedicated physical channel (F-DPCH); and
   a transmitter configured to send the power control information to the UE on the second carrier according to the uplink control configuration information.

5. The apparatus according to claim 4, wherein the transmitter is further configured to, before the power control information is sent to the UE, send the uplink control configuration information to the UE.

6. The apparatus according to claim 4, wherein the uplink control configuration information further comprises information about a second control channel for sending feedback information for uplink data that is sent by the UE to the uplink signal control apparatus on the first carrier.

7. The apparatus according to claim 4, wherein the transmitter is further configured to:
   after the receiver receives the uplink control configuration information, before the power control information is sent to the UE, and after the control information needs to be sent to the UE, send reception indication information to the UE, wherein the reception indication information is for instructing the UE to receive the power control information on the second carrier.

8. User equipment (UE), comprising:
   a receiver configured to:
     receive uplink control configuration information determined and sent by a first network device, or receive uplink control configuration information sent by a second network device, wherein the uplink control configuration information is determined in response to a determination that the UE enters a region between an uplink balance of a first carrier and a downlink balance of the first carrier, wherein the uplink balance of the first carrier corresponds to a first location of the UE where a signal transmitted by the UE on the first carrier is received by the first network device and the second network device with a same signal strength, and the downlink balance of the first carrier corresponds to a second location of the UE where a first signal transmitted by the first network device on the first carrier and a second signal transmitted by the second network device on the first carrier are received by the UE with a same signal strength; and receive, on a second carrier according to the received uplink control configuration information, power control information sent by the second network device, wherein the uplink control configuration information comprises information about a first control channel for sending the power control information, which is transmitted by the second network device on the second carrier, for controlling an uplink transmit power of the UE on the first carrier, wherein the first control channel comprises at least one of an enhanced dedicated channel-absolute grant channel (E-AGCH), an E-DCH relative grant channel (E-RGCH), or a fractional dedicated physical channel (F-DPCH); and a processor configured to control the uplink transmit power of the UE on the first carrier according to the power control information received by the receiver.

9. The UE according to claim 8, wherein the uplink control configuration information further comprises information about a second control channel for sending feedback information for uplink data that is sent by the UE to the second network device on the first carrier.

10. The UE according to claim 9, wherein:

the receiver is further configured to receive, on the first carrier, second control information sent by a third network device managed by the first network device; and the processor is further configured to control the uplink transmit power of the UE on the first carrier according to the power control information sent by the second network device and the second control information sent by the third network device.

11. The UE according to claim 8, the UE further comprising:

a transmitter configured to, before the receiver receives the uplink control configuration information, report supported capability information of the UE, to notify the first network device that the UE supports reception of the power control information on the second carrier.

12. The UE according to claim 8, wherein the receiver is further configured to, before the power control information is received on the second carrier, receive reception indication information sent by the second network device, wherein the reception indication information is for instructing the UE to receive the power control information on the second carrier.

13. An uplink signal control method, the method comprising:

determining, by a first network device, uplink control configuration information for user equipment (UE) in response to a determination that the UE enters a region between an uplink balance of a first carrier and a downlink balance of the first carrier, wherein the uplink control configuration information comprises information about a first control channel for sending power control information, which is transmitted by a second network device on a second carrier, for controlling an uplink transmit power of the UE on the first carrier, wherein the uplink balance of the first carrier corresponds to a first location of the UE where a signal transmitted by the UE on the first carrier is received by the first network device and the second network device with a same signal strength, and the downlink balance of the first carrier corresponds to a second location of the UE where a first signal transmitted by the first network device on the first carrier and a second signal transmitted by the second network device on the first carrier are received by the UE with a same signal strength, wherein the first control channel comprises at least one of an enhanced dedicated channel-absolute grant channel (E-AGCH), an E-DCH relative grant channel (E-RGCH), or a fractional dedicated physical channel (F-DPCH); and notifying, by the first network device, the uplink control configuration information to the second network device, and sending the uplink control configuration information to the UE or instructing the second network device to send the uplink control configuration information to the UE.

14. The method according to claim 13, wherein the uplink control configuration information further comprises information about a second control channel for sending feedback information for uplink data that is sent by the UE to the second network device on the first carrier.

15. The method according to claim 13, wherein before determining, by the first network device, the uplink control configuration information, the method further comprises:

receiving, by the first network device, supported capability information reported by the UE; and determining, according to the supported capability information, that the UE supports reception of the power control information on the second carrier.

16. An uplink signal control method, the method comprising:

receiving, by a second network device, uplink control configuration information sent by a first network device, wherein the uplink control configuration information comprises information about a first control channel for sending power control information, which is transmitted by the second network device on a second carrier, for controlling an uplink transmit power of user equipment (UE) on a first carrier, wherein the uplink control configuration information is determined in response to a determination that the UE enters a region between an uplink balance of the first carrier and a downlink balance of the first carrier, wherein the uplink balance of the first carrier corresponds to a first location of the UE where a signal transmitted by the UE on the first carrier is received by the first network device and the second network device with a same signal strength, and the downlink balance of the first carrier corresponds to a second location of the UE where a first signal transmitted by the first network device on the first carrier and a second signal transmitted by the second network device on the first carrier are received by the UE with a same signal strength, wherein the first control channel comprises at least one of an enhanced dedicated channel-absolute grant channel (E-AGCH), an E-DCH relative grant channel (E-RGCH), or a fractional dedicated physical channel (F-DPCH); and sending, by the second network device, the power control information to the UE on the second carrier according to the uplink control configuration information.

17. The method according to claim 16, wherein before sending, by the second network device, the power control information to the UE, the method further comprises:
sending, by the second network device, the uplink control configuration information to the UE.

18. The method according to claim 16, wherein the uplink control configuration information further comprises information about a second control channel for sending feedback information for uplink data that is sent by the UE to the second network device on the first carrier.

19. The method according to claim 16, wherein after receiving, by the second network device, the uplink control configuration information, and before sending the power control information to the UE, the method further comprises:
after the control information needs to be sent to the UE, sending, by the second network device, reception indication information to the UE, wherein the reception indication information is for instructing the UE to receive the power control information on the second carrier.

20. An uplink signal control method, the method comprising:
receiving, by user equipment (UE), uplink control configuration information determined and sent by a first network device or receiving uplink control configuration information sent by a second network device, wherein the uplink control configuration information is determined in response to a determination that the UE enters a region between an uplink balance of a first carrier and a downlink balance of the first carrier, wherein the uplink balance of the first carrier corresponds to a first location of the UE where a signal transmitted by the UE on the first carrier is received by the first network device and the second network device with a same signal strength, and the downlink balance of the first carrier corresponds to a second location of the UE where a first signal transmitted by the first network device on the first carrier and a second signal transmitted by the second network device on the first carrier are received by the UE with a same signal strength, wherein the uplink control configuration information comprises information about a first control channel occupied by power control information, which is transmitted by the second network device on a second carrier, for controlling an uplink transmit power of the UE on the first carrier, wherein the first control channel comprises at least one of an enhanced dedicated channel-absolute grant channel (E-AGCH), an E-DCH relative grant channel (E-RGCH), or a fractional dedicated physical channel (F-DPCH); and
receiving, by the UE on the second carrier according to the uplink control configuration information, the power control information sent by the second network device, and controlling the uplink transmit power of the UE on the first carrier according to the power control information sent by the second network device.

21. The method according to claim 20, wherein the uplink control configuration information further comprises information about a second control channel for sending feedback information for uplink data that is sent by the UE to the second network device on the first carrier.

* * * * *